US008276035B1

(12) United States Patent
Savarese et al.

(10) Patent No.: US 8,276,035 B1
(45) Date of Patent: Sep. 25, 2012

(54) HIGH PERFORMANCE DIGITAL COMMUNICATIONS RESILIENCY IN A ROAMABLE VIRTUAL PRIVATE NETWORK

(75) Inventors: Joseph T. Savarese, Edmonds, WA (US); Erik Olson, Seattle, WA (US); Michael Snyder, Seattle, WA (US); David Thompson, Shoreline, WA (US); Emil Sturniolo, Medina, OH (US)

(73) Assignee: Netmotion Wireless, Inc., Seattle, WA (US)

( * ) Notice: Subject to any disclaimer, the term of this patent is extended or adjusted under 35 U.S.C. 154(b) by 685 days.

(21) Appl. No.: 12/435,018

(22) Filed: May 4, 2009

Related U.S. Application Data

(60) Provisional application No. 61/084,076, filed on Jul. 28, 2008.

(51) Int. Cl.
*G06F 11/00* (2006.01)
(52) U.S. Cl. ........................... 714/749
(58) Field of Classification Search ............ 714/749, 714/752, 758, 776; 709/235, 236
See application file for complete search history.

(56) References Cited

U.S. PATENT DOCUMENTS

| | | | |
|---|---|---|---|
| 6,145,109 A | 11/2000 | Schuster et al. | |
| 6,421,387 B1 | 7/2002 | Rhee | |
| 6,986,097 B1 | 1/2006 | Ireland et al. | |
| 7,103,828 B2 | 9/2006 | Polk, Jr. et al. | |
| 2001/0023454 A1* | 9/2001 | Fitzgerald | 709/233 |
| 2003/0035420 A1* | 2/2003 | Niu | 370/389 |
| 2003/0112824 A1* | 6/2003 | Acosta | 370/474 |
| 2005/0086576 A1* | 4/2005 | Yokosato et al. | 714/776 |
| 2008/0144626 A1* | 6/2008 | Bertinelli et al. | 370/392 |
| 2008/0219204 A1* | 9/2008 | Lee et al. | 370/315 |
| 2008/0276147 A1* | 11/2008 | Gho et al. | 714/748 |
| 2011/0022919 A1* | 1/2011 | Sahara et al. | 714/748 |
| 2011/0099437 A1* | 4/2011 | Ramakrishnan et al. | 714/704 |

OTHER PUBLICATIONS

Jacobsmeyer, "Introduction to Error-Control Coding," Pericle Communications Company, 16 pages, (2004).
"Voice over IP: LAN-like Quality on the WAN," Silver Peak Systems, Inc., Mountain View, CA, 3 pages (2005).
"Next Generation Networks and The Cisco Carrier Routing System," Cisco Systems, Inc., 22 pages (May 2004).
Nichols, et al., "Definition of the Differentiated Services Field (DS Field) in the IPv4 and IPv6 Headers," RFC 2474, Standards Track, Differentiated Services Field (Dec. 1998).
Luby, et al., IETF RFC 3453 "The Use of Forward Error Correction (FEC) in Reliable Multicast" (2002).
Nichols, et al., IETF RFC 2474, "Definition of the Differentiated Services Field (DS Field) in the IPv4 and IPv6 Headers" (Dec. 1998).
Michelson, et al., "Error-Control Techniques for Digital Communication," Wiley-Interscience (Jan. 1985).

* cited by examiner

*Primary Examiner* — Scott Baderman
*Assistant Examiner* — Yair Leibovich
(74) *Attorney, Agent, or Firm* — Nixon & Vanderhye P.C.

(57) ABSTRACT

There is a class of applications that favor expediency of the communications over reliability. Counter-intuitively, the reliability aspect of a protocol may cause sub-optimal performance when considering this special class of applications in some environments. To resolve this performance issue, the exemplary illustrative non-limiting protocol implementation favors timeliness over reliability by allowing for loss of data, thus providing a non-guaranteed, order sensitive level of service. Such features can be combined in the same system and data stream/channel with a guaranteed-reliable protocol to provide a roamable VPN simultaneously providing both guaranteed-reliable and real-time, dynamically adaptable performance.

18 Claims, 23 Drawing Sheets

Example FecMachine EncodeFragPacket Activity Diagram

Edit Quality of Service

Set quality of service to: [High Priority TCP Application ▼]

[Edit]

Type of Service
DiffServ code point (DSCP):
Traffic shaping priority: [    ]

Datagram Queuing
Maximum time in queue: [    ] milliseconds
Flush immediately:

RPC FEC Settings
RPC FEC Level:
   Packet values:
   N (Total): [  ]  K (RPC): [  ]

RT IMP Enabled
RPC FEC Coalesce TimeOut
[      ] ms (0 - 10000)

[OK]  [Cancel]

Edit Quality of Service

Set quality of service to: [Custom ▼]

DiffServ code point (DSCP): [0 - Best effort ▼]
Traffic shaping priority: [5]

Datagram Queuing
Maximum time in queue: [10] milliseconds
Flush immediately: [No ▼]

[OK]  [Cancel]

FIG. 2C

Example Frame Structure
(Single Data Frame)

Example Frame Structure
(Single Parity Frame)
With Coalescing Disabled

Example Frame Structure
(Combined Parity and Data) with
Coalescing Enabled

Example FEC Preamble
(Coalescing Disabled)

Example FEC Preamble
(Coalesced Parity and Data in a Single Packet)

Example Comparison:
Coalescing Enabled and Disabled

Example Encode and FEC
Bandwith Optimization Bytes

Stack Receive Callback

Example Non-Limiting Work Flow

Example Class Relationship

Example RPC FEC Startup Sequence

Example Send Flow Shared Between rpfFec and FecMachine

Example Send Work Request Life Cycle

Example FecMachine EncodeFragPacket Activity Diagram

Example Encoder Object Encode Method

Example Encoder Multiply Matrix

Example Receive flow

Example Decode

Example Put Block

Example Decode

HIGH PERFORMANCE DIGITAL COMMUNICATIONS RESILIENCY IN A ROAMABLE VIRTUAL PRIVATE NETWORK

CROSS-REFERENCE TO RELATED APPLICATIONS

This application claims priority from provisional application No. 61/084,076 filed Jul. 28, 2008, incorporated herein by reference.

TECHNOLOGICAL FIELD

The technology herein relates to data communications and/or storage, and more particularly to providing increased resiliency in digital communications and/or systems and methods. More particularly, the technology herein relates to methods, apparatus and techniques for supporting real time digital communications applications including but not limited to wireless or other mobility/roaming networking optimization. Still more particularly, the technology herein provides communication optimizations that can adapt to dynamically changing network conditions.

BACKGROUND AND SUMMARY

It used to be that the Internet and wide area communications networks were not generally expected to deliver data in a time critical or even very timely manner. Users generally expected a few seconds or even a few minutes of delay as data traversed unpredictable routing paths through large networks. Such lack of timeliness was accepted for many types of data transfers including for example email and computer files.

Now, however, there is ever increasing demand for "real time applications" such as voice and video. People want to watch streaming video of their favorite TV shows, movies and shared home movie site downloads on their cell phones and other portable web-enabled appliances. Teenagers want to voice chat and/or video chat with friends. More and more people now are using their Internet connections to make telephone calls. Countless businesses, public safety agencies and others are deploying some type of wireless or wired technology so the same communications network can carry both voice and data. So-called "Soft Phones" (software that allows a computing device to perform the functions of a telephone) are moving beyond the college dorm room and are on the road to becoming important enterprise applications and collaboration tools. Major telecommunications providers including large "telephone companies" are getting into the game by deploying increasing numbers of Internet Protocol based "telephone" switching stations and providing softphone solutions in addition to handsets. More traditional Internet Service providers are expanding their offerings to include Internet Multimedia Service (IMS) products providing a wide range of services including but not limited to Voice Over Internet Protocol ("VoIP").

Such real time applications are destined to become ubiquitous. As users increase their use of real time applications, it is foreseeable that usage will expand to a wide variety of networks and data communications infrastructures including for example remote access from cable modems, DSL, 802.11 (WIFI) hotspots, WiMax and next-generation cellular telephone systems. Delivery platforms could include all sorts of devices such as but not limited to desktop computers, laptop computers, and portable devices such as personal data assistants, cell phones and any of a variety of other computing and/or web-based appliances.

Existing conventional technologies such as Voice Over Internet Protocol (VOIP) provide functionality that allows voice or other streaming data to be carried over conventional Internet Protocol (IP) connections. Such technology has become widely adopted in a variety of contexts. However, significant challenges remain. For example, real time applications are generally more sensitive to network vagarities and constrained network bandwidth than general network applications or traditional "data" applications. Much work has been done to try to solve these challenges, but the problems have not yet been fully addressed. Sensitivity to the underlying network, diversity of environments, the desire to roam, security issues and the convenience of traversing firewalls are all factors to consider when supporting real time applications within and outside the enterprise.

One example approach to efficiently carrying real time application information over IP networks has been termed "Next Generation Networking" (NGN) spearheaded by the International Telecommunications Union "Next Generation Network Global Standards Initiative", ETSI and others. One idea behind this approach is to label each type of data packet with the type of information it contains (e.g., data, voice, video, audio, etc.) and handle each packet differently for Quality of Service (QOS) and other purposes. While NGN shows promise, it is not clear right now how such architectures can be made compatible with existing security architectures protecting privacy and data integrity. A significant challenge therefore relates to how to use Voice Over IP and other real time applications to provide "unified communications" (e.g., voice, video, instant messaging, collaboration, other) in conjunction with existing or new Virtual Private Network (VPN) architectures—especially VPNs that can provide mobility and allow mobile and portable users to roam between networks and subnetworks.

Meanwhile, Virtual Private Networks (VPNs) have all but replaced private wirelines of just a few years ago. Many enterprises have come to rely on VPNs to protect their communications from eavesdroppers and hackers. Generally speaking, a VPN uses encryption to construct a secure "tunnel" through a network. The tunnel provides end-to-end protection for the information flowing through the tunnel. Only the devices (encrypting/decrypting engines) at each end of the tunnel can access information flowing within the tunnel. Intermediate devices generally have no access because they cannot break through the tunnel's encrypted walls. This is good from a secrecy standpoint but can cause significant problems for devices that are attempting to handle data packets differently based on packet contents. Since most VPNs use encryption to intentionally try to make all data packets unintelligible to all network nodes except the intended recipient's decryption engine at the other end of the tunnel, intermediate nodes attempting to handle or process packets differently based on packet marking and/or contents will generally fail. This can present significant challenges to Quality of Service (QOS), carrier compression, call policy, error recovery/resiliency, low jitter, low latency, browser mobility policies, peer-to-peer mode and other issues.

For example, the performance of virtual private networks would be enhanced if they can take advantage of advanced compression techniques within carrier networks. It would be helpful if a VPN were capable of identifying VoIP and other real time data flows and assign associated priorities to take advantage of the quality of service in the underlying infrastructure as well as within the tunnel itself. In certain contexts, a VPN could also be a convenient place to implement call policies such as caller ID, valid networks, permitted callers and time of day. A VPN could be able to manage roaming with real time data flows. A VPN also could become a convenient way for enterprises to manage secure remote peer to peer communication. A VPN is a convenient way to traverse firewalls and NATS with real time and SIP based applications. In addition, the VPN is in an excellent position to enforce management of these applications. VPNs can also be a convenient method for managing web browsing activities.

Despite such potential advantages, existing VPNs are generally not particularly good at handling real time applications. Jitter and latency tend to be real problems. Latency can be thought of as the amount of time a communication is delayed. Jitter can be thought of as variance in arrival time for different packets or other received communication units. Latency of up to 300 or even 400 milliseconds can be tolerated for most real time applications (even voice communication), but in modern networks it is very possible that different packets will take different paths to get from point A to point B, thereby creating a substantial amount of jitter. If packets arrive at widely differing arrival times, a receiver may need to temporarily store ("buffer") the received packets (thereby increasing latency for all received packets) to even out arrival time variances. The quality of real time applications can suffer noticeably if buffering is inadequate. For example, a VPN running full duplex VOIP or other real time data flows should preferably not increase jitter or add to network latencies and should preferably not cause error bursts or bursts of outdated packets, but should instead reduce packet errors and error bursts whenever possible. But issues can arise that relate to ways communications systems handle transferring data packets between endpoints in the presence of data and packet loss.

For example, conventional TCP protocols when used with conventional VPNs can often cause severe jitter problems. The so-called "ARQ" (automatic repeat request) error control such as currently used by the IEFT standard TCP protocol involves the sender retransmitting lost packets when the receiver indicates that it has not received all intended data. Such ARQ techniques provide high reliability but can in some cases increase both latency and jitter.

Since IPSEC and other existing security agents are generally not bound by TCP constraints and can use UDP instead, some or many of these problems can be overcome by foregoing TCP acknowledgements and associated guaranteed reliable delivery. However, IPSEC in the past has not generally provided mobility. Every time a VPN end node changes address in such systems, previous versions of IPSEC will generally lose the connection. An industry consortium is attempting to enhance IPSEC with a 2.0 version that will allow renegotiation of end node addresses. But most IPSEC encapsulation requires a substantial amount of overhead (e.g., 32 bytes of overhead plus padding for each data packet sent). The extra overhead can sometimes cause problems in handling and communicating real time applications.

One known method, termed "packet loss concealment", involves using techniques such as interpolation and/or reconstruction from the last known good reception of data to hide lost data from applications. A technique that can be used to effect packet loss concealment is forward error correction (FEC) for packet erasure purposes.

Shannon demonstrated in the late 1940's that noise on a communications channel does not necessarily prevent error-free communications. Shannon theorized that error codes could provide error-free communications even in the presence of noise, and that noise thus reduces the channel capacity but not necessarily error rate. By the early 1980's, the techniques had progressed sufficiently so that inexpensive computing devices could be programmed to provide error correction coding for now-ubiquitous Compact Disc players. See for example Jacobsmeyer, "Introduction to Error-Control Coding" (Pericle Communications 2004).

Generally speaking, forward error correction involves adding redundancy in such a way that lost bits, in the case of a bit stream, or lost packets, in the case of datagram stream, may be recovered by the receiver without requiring the sender to retransmit data (or so that the receiver can tell packet integrity has been lost).

Certain FEC codes are sometimes denoted as ("n,k") codes, where n-k is the number of parity check packets, n is the total number of packets in a block and k is the number of original data packets to be transmitted from the sender to the receiver. For example, letting n=8 and k=5 means sending 8 packets consisting of 5 data packets and 3 parity check packets. The parity check packets are used to correct and recover lost packets in the event any 3 of the 5 data packets are lost. Such a code is called a "k/n=5/8 rate" code to indicate it takes a total of 8 packets to send the intended 5 data packets. Note that in this instance, the additional 3 packets are "overhead" used to provide a zero error rate. Sending these additional packets thus reduces the capacity of the communications channel while nevertheless providing error-free transmission, just as Shannon postulated.

IETF RFC 3453 "The Use of Forward Error Correction (FEC) in Reliable Multicast" (2002) proposed to use a block (n, k) FEC code for certain network transmissions such as reliable IP multicast transmissions. This RFC 3453 describes encoding some number k of source symbols into n encoding symbols n>k, such that any k encoding symbols can be used to recreate an exact copy of the original k source symbols. A popular example of these types of codes is the class of Reed-Solomon codes, which are based on algebraic methods using finite fields. Generally, in practice, the values of k and n are kept small (for example below 256) for such FEC codes as large values can make encoding and decoding prohibitively expensive for certain applications. As many objects are longer than k symbols for reasonable values of k and the symbol length (e.g. larger than 16 kilobyte for k=16 using 1 kilobyte symbols), they are often divided into a number of source blocks. Each source block consists of some number k of source symbols, where k may vary between different source blocks. The FEC encoder is used to encode a k-symbol source block into a n encoding symbol encoding block, where the number n of encoding symbols in the encoding block may vary for each source block. For a receiver to completely recover the object, for each source block consisting of k source symbols, k distinct encoding symbols (i.e., with different encoding symbol IDs) are received from the corresponding encoding block. For some encoding blocks, more encoding symbols may be received than there are source symbols in the corresponding source block, in which case the excess encoding symbols are discarded.

These and other FEC error coding techniques are straightforward to implement. However, as mentioned above, existing FEC techniques can add overhead to the network when least desired. Packet loss is often caused by congestion. Sending multiple copies of a single packet or additional parity codes increases congestion proportionately. This reduces bandwidth efficiency, thus reducing end to end performance (speed) for other applications attempting to share the network. Furthermore, FEC does not necessarily inherently scale, so adding more robustness can cause an exponential increase in bandwidth requirements.

Decreased latency is another area of further potential improvement when attempting to communicate real time information. In the absence of dropped packets, it is desirable for any forward error correction technique to add minimal (approximating zero) additional latency and jitter to packet transfers over and above the latency and jitter of UDP packet transfers not employing forward error correction. It is also desirable for any FEC techniques to add little additional overhead, thereby minimizing network overhead for small and large packets. Attention should also be paid to dynamic characteristics. Bandwidth (BW) efficiency and burst error protection levels should be easily adjusted to accommodate varying levels of BW utilization, packet loss, latency and jitter requirements.

It would also be desirable to provide a solution that is scalable so that it can correct lost packets for any (n–k) out of n packets. Some examples of desired FEC rates ("values of k/n") may be for example 2/4, 3/5, 5/7, 5/10, 125/150, 32/39 etc. For a 32/39 code, for example, one might want to correct any 7 packets out of 32. Such a code hypothetically could be used for example under existing protocol layers to augment ARQ capability when a window of 32 packets is employed. But for real time applications, a hypothetical 3/5 code may be more appropriate where latency and jitter levels should be minimized to maintain acceptable real time performance.

It would also be desirable to provide a programmatic solution for detecting different types of traffic so that real time optimizations such as but not limited to FEC can be selectively applied. As mentioned above, typical virtual private networks use encryption to prevent eavesdroppers from accessing the information flowing through the secure tunnel. These same encryption techniques can prevent routers and other network appliances from looking inside the secure tunnel to ascertain whether information flowing through it is real time information (to which real time optimizations might be applied) or data (which might require 100% or near 100% reliability). Sometimes in the past, network administrators have tried to solve this problem by allocating different ports to different types of traffic. For example, real time applications might be told to use certain ports whereas data applications might be directed to use certain other ports. However, there is no widely adopted standard for port allocation, and therefore different applications often use different ports for different purposes. Typically in the past, it has been up to a network administrator to try and figure out which applications within an enterprise are using which ports for which traffic types.

One common solution is to maintain a large database of applications and associated port allocation usage. It would be desirable to provide a flexible solution that does not need to know in advance which port a particular application will use for particular types of traffic and to nevertheless be capable of adapting to provide real time optimizations such as FEC to real time data so that the same techniques that are successfully used to manage the reliability of for example TCP data packets are not applied to real time UDP packets where they will potentially, depending upon network conditions and other factors, undesirably increase latency and jitter.

Furthermore, while real time applications can benefit from forward error correction and other techniques that increase the reliability of packet delivery, it may not be essential to the end user experience that such techniques always be applied no matter what network conditions prevail. There are tradeoffs between timeliness and error-free communication that a well-designed system should preferably be able to dynamically take into account. This becomes especially important within the context of a communications system supporting mobile and portable devices that can roam between networks and subnetworks. As user devices roam, noise, bandwidth and congestion can change radically from moment to moment. Some past attempts at managing such traffic simply "break" under the stress of rapid changes in network conditions, causing undesirable user experiences including for example loss of an ongoing soft phone voice communication or "freezing" of real time media streams such as audio or video. It would be highly desirable for a system to be able to recognize and adapt to changing network conditions to dynamically throttle back on the amount of error correction and other techniques being applied to thereby deliver packets as reliably as possible with minimal added latency and jitter.

For example, it would be desirable to add error correction optimizations only or primarily when it does not affect bandwidth in a significantly adverse manner. When prevailing network conditions are significantly adversely impacting timeliness of packet delivery, then it may be desirable to dynamically decrease or even altogether eliminate error correction optimization. Such decisions concerning whether to apply error correction optimizations should preferably be made in a timely manner in a block by block (or packet by packet) basis so that error correction can be used when it is beneficial but is tuned based on the tradeoff between error correction and timeliness.

The exemplary illustrative non-limiting implementations described herein add optimization such as forward error correction when such optimizations do not substantially affect bandwidth or delivery timeliness in an adverse manner, but are capable of dynamically adapting to changing network conditions so that the optimizations are throttled back or even eliminated altogether when network conditions dynamically change in certain ways.

In one exemplary illustrative non-limiting implementation, each block of real time data packets transmits N and K parameters associated with forward error correction. This allows a mobile VPN application to tune or adjust the optimizations dynamically by changing N and K "on the fly." Every K packet can be reviewed for packet size, and minimum and maximum packet size can be taken into account in determining the nature of the optimizations to be applied. In one exemplary illustrative non-limiting implementation, for example, forward error correction is continually turned on but in some cases (e.g., where bandwidth is limited so that it is important to decrease network overhead), the additional overhead associated with sending parity information can be eliminated simply by not sending parity. As long as the packets arrive in order, the mobile VPN can hand those received packets off to the application rapidly. If a packet gets dropped, the mobile VPN can attempt to correct it if parity information is available. If no parity information is available, then no correction is applied.

In one exemplary illustrative implementation, a small received packet buffer can be used to keep track of which packets have been received. In the case where degraded network conditions result in dropping of a packet (e.g., packet one was received, packet three was received, but packet two was not received), receipt of the first packet and a succeeding block or a receive time out may prompt the receiving agent to look at the list of received packets. If parity is available, the receiving agent can apply the parity using a conventional forward error correction process to reconstruct the packet that was dropped. If parity information is not available, then in a real time application context the receiving agent can immediately send the packets it has received to the application. Different actions can be performed if the packet is not real time data. This dynamic adjustment in favor of timeliness for real time applications can result in a more satisfying user experience at least because often in such applications timely delivery is more important than 100% accuracy.

In accordance with further exemplary illustrative non-limiting implementations, conventional data packets that should desirably be sent with near 100% reliability are usually transmitted using an "ARQ" protocol such as TCP, whereas real time packets (e.g., video, audio, instant messaging, collaboration, other) are typically sent using a non-acknowledgment protocol such as UDP. Using a resident low-level monitoring and/or routing function at or near the data transport or other layer of originating and receiving computing appliances, it is possible to determine irrespective of port assignment whether the packets being communicated are real time data or non-real time data by determining whether for example TCP or UDP is being used. Once the mobile VPN determines that UDP is being used by the application to send the information, it is desirable to first make sure that UDP data is amiable to the kind of optimizations that may improve reliability or whether such optimizations could cause more harm than good. One exemplary illustrative non-limiting dynamic optimization looks at packet size variance per K block. If that variance is greater than some value (which may be configurable in bytes for example), the mobile VPN can decide to forward blocks without parity and/or other enhancements (e.g., encryption). Most real time applications are already designed to handle dropped packets, so in such instances it may be more desirable to provide timely delivery without optimization when optimizing will do more harm than good.

The exemplary illustrative non-limiting implementation mobile VPN dynamically knows when to apply optimizations and when not to apply them. For example, the exemplary illustrative non-limiting mobile VPN can turn on optimizations based on an IP manager's configuration of an application and may turn off optimizations for a particular block of K packets based on variance and packet size. The exemplary illustrative non-limiting implementation is also capable of dynamically changing N and K parameters associated with forward error correction depending upon network conditions. For example, it is possible to dynamically adjust N to add or decrease the number of parity packets per block depending upon error rate. If a decoding peer indicates that decode errors are occurring, the exemplary illustrative non-limiting mobile VPN can increase N. If network bandwidth is so limited that increasing parity overhead will result in overall decreased performance, the exemplary illustrative non-limiting mobile VPN can maintain or even decrease N (the number of parity packets per block) to avoid compounding the prevailing network congestion problem—or in an extreme case, disable FEC altogether. Such dynamic resilience based on changing network conditions due to roaming or other factors results in significant improvements over prior techniques.

Still further improvements can be obtained by managing and shaping information traffic within a VPN tunnel. Such traffic management can be performed based for example on policy and/or priority criteria.

One exemplary illustrative non-limiting implementation allows policy to be shared between server and client, providing an agreement for use in accessing the VPN's encrypted tunnel. By thus exerting distributed, coordinated control at each of the tunnel ends, it is possible to overcome many of the challenges of VPN use without need to weaken end-to-end security.

Exemplary illustrative non-limiting implementations described herein provide a set of features allowing expediency to be favored over reliability when such would be advantageous. Exemplary illustrative non-limiting criteria for these modifications include for example:

Dynamic adjustment of optimizations including but not limited to forward error correction depending on network conditions, to adapt to roaming of a mobile end system between networks or subnetworks and/or other network events (e.g., change in network congestion level, available bandwidth or other factors).

Different optimizations applied to real time (e.g., voice and video) communications and non-real time (e.g., data delivery) communications in a "unified communication" mobile virtual private network so that for example non-real time data can be delivered with 100% or near 100% reliability whereas real time data can be delivered with degrees of error correction and other optimization processing that dynamically take timeliness and network conditions into account.

Add optimizations to real time data only or primarily when such optimizations do not adversely affect bandwidth and/or result in overall performance improvements depending upon network conditions.

Efficient ability to handle dropped parity and dropped packets.

Integration with policy management to give an IT manager or others an ability to specify whether a mobile virtual private network will apply optimizations on an application-by-application basis.

Adapt to ephemeral port allocation and eliminate the need for a network administrator to be involved in determining in detail which port(s) the application will use for such real time applications and/or to maintain a database correlating port assignments with different types of data flows.

Programmatically determine which port(s) are being used by a particular application and apply desired real time optimizations to the application by further distinguishing between real time and non-real time data based on protocol (e.g., an ARQ protocol such as TCP, or a non-ARQ protocol such as UDP).

Low level monitoring at or near the transport layer to automatically distinguish between different application protocol streams.

Dynamically monitor packet size variance to selectively and dynamically adjust the degree of parity or other forward error correction overhead to thereby dynamically take network congestion and other factors into account, thereby maximizing the benefit of optimizations such as forward error correction, encryption etc. while minimizing their potential adverse impact on network overhead and timeliness.

Optimal use of a packet-based forward error correction algorithm by applying packet sized variance per k block.

Dynamically, automatically determining when (and whether) to reduce or turn off error correction or other optimizations based on packet size variance and/or other factors.

In an N/K forward error correction protocol (where N represents number of parity packets per block and K represents total number of packets, K>N), dynamically changing N based on packet size variance, observed decode error rate or other factors.

Gratuitously informing peers of observed decode error rates to allow peers to dynamically adjust forward error correction parameters.

Providing separate and distinct forward error correction (N, K) parameters for real time and non-real time packets coalesced into the same block, to allow different optimizations to be applied to different data types (keeping in mind that for forward error correction purposes, each data packet should be mutually exclusive).

Support for number of parity packets N−K>K.

Selective dynamic enabling/disabling of data coalescing depending on prevailing network conditions.

Dynamic tuning of optimization(s) to maintain acceptable real time data communication performance.

Side by side operation of guaranteed delivery and unreliable protocols within the same mobile VPN tunnel, with appropriate dynamic optimizations applied to teach data stream type.

Interaction between forward error correction and block encryption without compromising security.

With the help of an RPC layer, coalescing together real time data from different sources on a mobile end system (MES), targeted for the same or different destinations, into a single stream and forwarding the coalesced data to an intermediary server (MMS). The data may then be demultiplexed at the MMS back into multiple distinct streams and sent on to its ultimate destination. The reverse operation can happen for data destined for the MES.

Allowing multiplexing of multiple real time streams for maximum use of available bandwidth, by generating the maximum sized network frames possible. Since expediency is favored, a maximum number of RPC requests that can be coalesced into a single block or message may be imposed.

In addition to using AES or other stream cipher functionality for existing traffic, the exemplary illustrative non-limiting technology herein may use counter mode security meeting for example, FIPS 140-2 compliancy.

The exemplary illustrative non-limiting technology herein may employ a cumulative Quality of Service marking algorithm. As each RPC request is coalesced, the QoS marking with the highest magnitude can be preserved and transferred with the subsequent frame.

The exemplary illustrative non-limiting technology herein can be engineered to be transport independent and to allow the network point of presence (POP) or network infrastructure to change without affecting the flow of data except where physical boundary, policy or limitations of bandwidth apply.

Exemplary illustrative non-limiting frames have a predetermined type and header format to further increase efficiency and reduce protocol overhead When the PDU for a given block or message is greater then the available MTU of the network medium, standard fragmentation and reassemble functions may be provided.

Semantics of unreliable data can be preserved by allowing RPC requests to be efficiently discarded.

To ensure that a single communications session does not boundlessly consume resources, the exemplary illustrative non-limiting technology herein may in one implementation employ a depth limited FIFO queue. If the maximum queue depth is reached, a head-end discard mechanism can efficiently flush stale data and accept the most recent request.

The exemplary illustrative non-limiting technology herein can consider the send and receive transmission paths separately and automatically tailor its operating parameters to provided optimum throughput. Based on hysteresis or other factors, it is possible to adjust such parameters as frame size (fragmentation threshold), number of frames per second (rate limiting), etc.

The exemplary illustrative non-limiting technology herein is preferably designed to be network fault tolerant. Since the expected usage can be in a wireless environment, temporary loss of network connectivity does not necessarily need to result in termination of the session.

The exemplary illustrative non-limiting technology herein may employ a frame sequencing scheme allowing the receiver to detect out of order reception and not wrap within a reasonable amount of time.

In the exemplary illustrative non-limiting implementation herein, sequence numbers need not be byte oriented, thereby allowing for a single sequence number to represent up to a maximum of, for example, 65535 octets of information including the header (i.e., frame size can be represented as a 16 bit value in the header in one exemplary illustrative non-limiting implementation).

The exemplary illustrative non-limiting implementation herein provides a balanced design, allowing either peer to migrate to a new point of presence.

In the exemplary illustrative non-limiting implementation, either side may establish a session to a peer.

Capable of providing data and real time support for streams of datagrams such as those of real time applications and traditional datagram applications such as NetBios.

Minimizing memory requirements for buffering and the like.

In one particular exemplary illustrative non-limiting implementation, a Reed Solomon (RS) erasure code using Vandermond matrixes is employed to provide error correction capabilities for applications using receive datagram event and send datagram request remote procedure calls (RPCs). An RS block can be defined as a Reed Solomon Block of packets. Each block consists of N packets where K of the N packets are RPCs transmitted between Mobility mobile end systems (MES) and mobility servers, and (N−K) packets are parity derived from the K RPCs. The example protocol permits N values to range from 0 to 31. When N=0, FEC is considered disabled. K values are permitted to range from 0 to (N−1). Therefore, when N=1, K must be 0 so FEC is considered disabled for both N=0 and 1. Within the enabled ranges of N and K, all combinations of N and K are permitted.

The exemplary illustrative non-limiting implementation can include cases where N−K>K, the number of parity packets per block exceeds the number of data packets per block. This may be desired when running on networks with extreme conditions such as those experienced on wireless networks such as current 3G, CDMA technologies.

The exemplary illustrative non-limiting implementation provides a method to dynamically adjust N and K values within their configured maximum ranges dynamically by adjusting to network conditions.

The exemplary illustrative non-limiting implementation provides bandwidth optimizations and heuristics that detect flows which are inappropriate for fec encoding and bypass encoding on a per RS block basis because they would otherwise cause excessive bandwidth expansion on networks if encoding had occurred.

For performance reasons on highly scalable servers that may have 10s of 000s of transactions and packets to process per second, received and sent data packets are not, in one exemplary implementation, copied before they are provided to the encoder and decoder for processing. To avoid copies, a reference count exemplary illustrative non-limiting implementation is used to permit data packets to be delivered to more than one object at a time such as the receiving applications, decoders, networks and encoders.

Policy management, heuristics on the real time protocol RTP protocol, and the Session Initiation Protocol, SIP may be used on a per user, application, device, network, time of day, or any other supported trigger to define a flow that would benefit by having FEC enabled. The exemplary illustrative non-limiting real time protocol, RTP does not use well known ports for selecting flows. This makes it difficult for an IT manager or administrator to know in advance which ports to select for FEC. This problem is solved with an ability to identify flows using one of the aforementioned methods and selecting the UDP flows associated with that application as having access to the FEC service.

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 2A-2D show exemplary illustrative non-limiting user interface display configuration screens;

DETAILED DESCRIPTION

Figure 1:
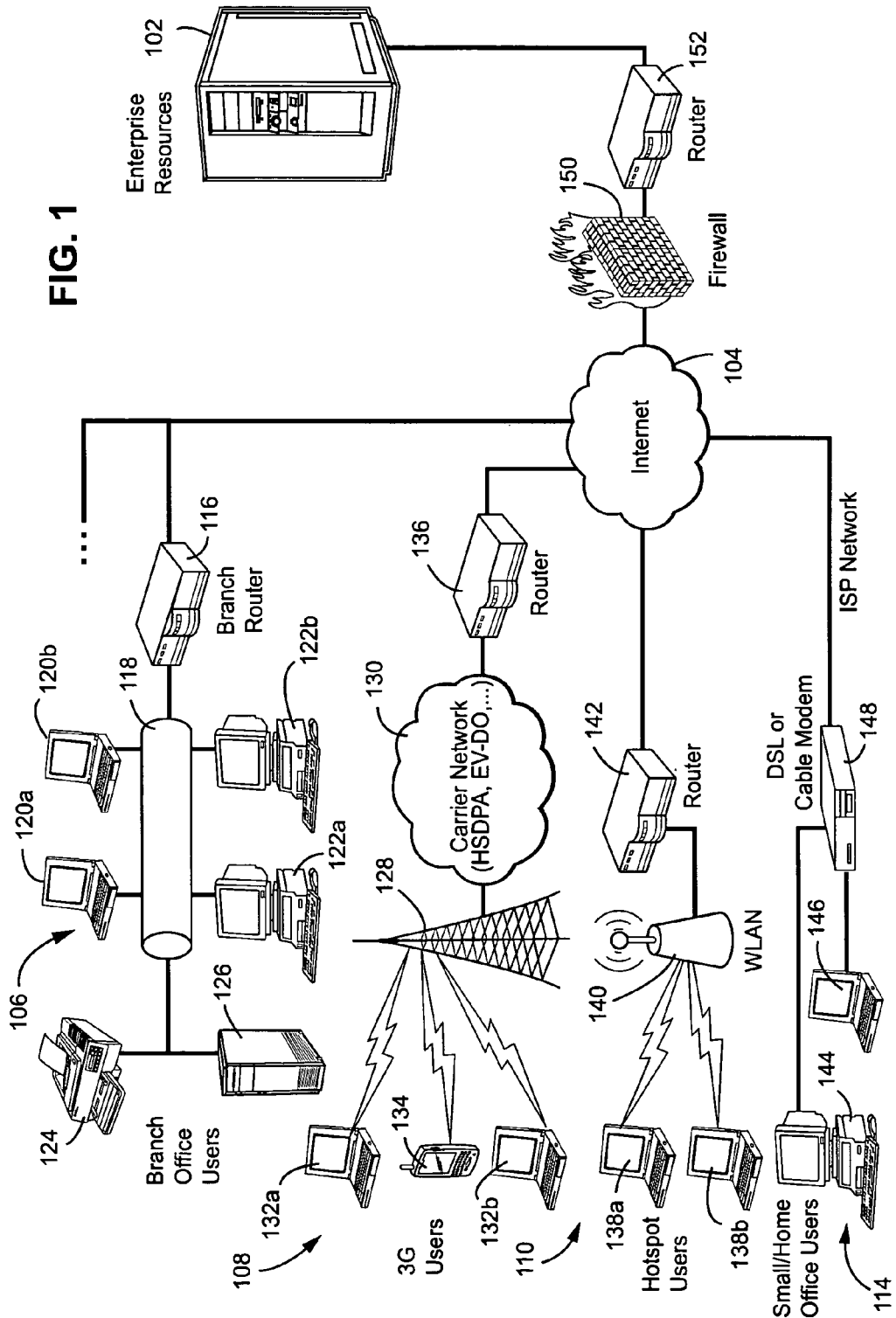
FIG. 1 shows an exemplary illustrative non-limiting system providing a wired or wireless secure roaming-based communications system providing dynamic optimization of real time data packets including for example voice, audio, instant messaging, collaboration and/or other real time communication.

Many real time applications tolerate some level of loss and favor expediency over reliability. Although at least some previous virtual private network protocols were designed to allow for efficient transfer of reliable and unreliable data, expediency was sometimes not of utmost importance. By way of example without limitation, NetMotion Wireless' Mobility virtual private networking technology has provided an efficient mechanism for multiplexing multiple streams of data (reliable and unreliable) through a single virtual channel. It accomplishes this task through a variety of techniques. Additional information regarding these techniques can be found in U.S. Pat. Nos. 6,546,425 and 6,981,047. Due to the increased popularity of real time applications, there is a desire to further expose the attributes that allow for unreliable communications.

The exemplary illustrative non-limiting illustrative system and method provides a message oriented connection based protocol. Such message oriented connection based protocols such as, for example and without limitation, those used by Netmotion Wireless in past products, provide guaranteed delivery, (re)order detection and loss recovery. Multiple distinct streams of data can be combined over a single channel. Guaranteed, unreliable data and new message oriented reliable data can traverse the network through the single virtual channel simultaneously.

Such an exemplary illustrative message oriented connection based protocol can be designed to be an overlay on existing network topologies and technologies. Due to its indifference to the underlying network architecture, the protocol can be transport agnostic. As long as there is a way for packetized data to traverse between two peers, the exemplary illustrative non-limiting protocol can be deployed. Each node's network point of presence (POP) or network infrastructure can also be changed without affecting the flow of data except where physical boundary, policy or limitations of bandwidth apply.

With the help of the layer above, an exemplary illustrative non-limiting protocol implementation coalesces data from many sources and shuttles the data between the peers using underlying datagram facilities. As each discrete unit of data (PDU) is presented from the upper layer, they are combined into a single stream and subsequently submitted for transmission. The PDUs are then forwarded to the peer over the existing network where upon reception, with the help from the layer above, the stream is demultiplexed back into multiple distinct PDUs. This allows for optimum use of available bandwidth, by generating the maximum sized network frames possible for each new transmission. This also has the added benefit of training the channel once for maximum bandwidth utilization and have its parameters applied to all session level connections. In rare instances where one channel is insufficient, the exemplary illustrative non-limiting protocol technology further allows multiple channels to be established between the peers, thus allowing for data prioritization and possibly providing a guaranteed quality of service (if the underlying network provides the service).

The illustrative non-limiting exemplary protocol implementation provides a dynamically selectable guaranteed or unreliable level of service. Each PDU that is submitted for transmission can be queued with either a validity time period or a number of retransmit attempts or both. A PDU will expire when either threshold is reached, and removed from subsequent transmission attempts.

Additional protocol overhead is kept minimal by use of variable length headers. The frame type and any optional fields determine the size of the header. These optional fields are added in a specific order to enable easy parsing by the receiving side and bits in the header flag field denote their presence. All other control and configuration information necessary for the peers to communicate can be passed through the in-band control channel. Any control information that needs to be sent is added to the frame prior to any application level PDU. The receiving side processes the control information and then passes the rest of the payload to the upper layer.

Designed to run over relatively unreliable network links where the error probability approaches 10-4, an exemplary illustrative non-limiting protocol implementation utilizes a number of techniques to insure data integrity and obtain optimum network performance. To insure data integrity, a Fletcher or other checksum algorithm is used to detect errant frames. This algorithm was selected due to the fact of its efficiency as well as its detection capability. It can determine not only bit errors, but also bit reordering.

Sequence numbers can be used in an exemplary illustrative non-limiting implementation to insure ordered delivery of data. Sequence numbers need not however represent each byte of data; they can represent a frame of data and can be as large as, by way of example without limitation, 65535 bytes including the header. They may be for example 32 bits in length in one exemplary illustrative non-limiting implementation to insure that wrap-around does not occur over high bandwidth links in a limited amount of time.

Combining this capability, along with the expiration of data, retransmitted frames may contain less information than the previous version that was generated by the transmitting side. In one exemplary illustrative non-limiting implementation, a nonce is provided to enable detection of the latest version frame. However, since data is never added in the exemplary illustrative non-limiting implementation, and each element removed is an entire PDU, this is of little necessity and used mostly for statistical purposes in one exemplary illustrative non-limiting implementation. An exemplary illustrative non-limiting implementation will only process the first instance of a specific frame it receives, no matter how many other versions of that frame are transmitted. Each frame created that carries new user payload is assigned its own unique sequence number.

In one exemplary illustrative non-limiting implementation, performance is gained by using a sliding window technique, thus allowing for more than one frame to be outstanding (transmitted) at a time before requiring the peer to acknowledge reception of the data. To insure timely delivery of the data, a positive acknowledgement and timer based retransmit scheme is used. To further optimize the use of the channel, a selective acknowledgement mechanism is employed that allows for fast retransmission of missing frames and quick recovery during lossy or congested periods of network connectivity. This selective acknowledgement mechanism is represented by an optional bit field that is included in the header.

A congestion avoidance algorithm can also be included in one exemplary illustrative non-limiting implementation to allow the protocol to back off from rapid retransmission of frames. A round trip time is calculated for each frame that has successfully transferred between the peers without a retransmit. This time value is averaged and then used as the basis for the retransmission timeout value. As each frame is sent, a timeout is established for that frame. If an acknowledgement for that frame is not received, and the frame has actually been transmitted, the frame is resent. The timeout value is then doubled and then used as the basis for the next retransmission time. This retransmit time out is bounded on both the upper and lower side to insure that the value is within a reasonable range.

One exemplary illustrative non-limiting implementation also considers the send and receive paths separately. This is useful on channels that are asymmetric in nature. Based on hysteresis, for example, it may automatically adjust such parameters as frame size (fragmentation threshold), number of frames outstanding, retransmit time, and delayed acknowledgement time to reduce the amount of duplicate data sent through the network.

The exemplary illustrative non-limiting implementation allows a node to migrate to different points of attachment on diverse networks. Thus, in this exemplary illustrative non-limiting implementation, characteristics of the underlying network such as for example frame size may change midstream. An artifact of this migration is that frames that have been queued for transmission on one network may no longer fit over the new medium the nomadic device is currently attached to. Combining this issue with the fact that fragmentation may not be supported by all network infrastructures, fragmentation is dealt with at the level of the exemplary illustrative non-limiting protocol. Before each frame is submitted for transmission, the exemplary illustrative non-limiting protocol assesses whether or not it exceeds the current fragmentation threshold. Note that this value may be less than the current MTU of the connected medium for performance reasons—smaller frames have a greater likelihood of reaching its ultimate destination than larger frames. The tradeoff between greater protocol overhead versus more retransmissions is weighed, and the frame size may be reduced in an attempt to reduce overall retransmissions. If a given frame will fit, it is sent in its entirety. If not, the frame is split into maximum allowable size for the given connection. If the frame is retransmitted, it is reassessed, and will be refragmented if the MTU has been reduced, or if the MTU actually grew, resent as a single frame.

The exemplary illustrative non-limiting protocol itself is orthogonal in its design as either side may establish or terminate a connection to its peer. There are however a few minor operational differences. Based on where the protocol engine is running, certain timeouts are only invoked on one side. These timeout values are for inactivity detection and lifetime of a given connection. To allow administrative control, the exemplary illustrative non-limiting protocol on the MMS keeps track of inactivity periods. If the specified period of time expires without any activity from the MES, the MMS may terminate a session. Also, an administrator may want to limit the overall time a particular connection may be established for, or when to deny access base on time of day. Again these policy timers are only invoked on the MMS side in the exemplary illustrative non-limiting implementation.

As noted previously, there is a class of applications that favor expediency of the communications over reliability. Counter-intuitively, the reliability aspect of a protocol may cause sub-optimal performance when considering this special class of applications in some environments. To resolve this performance issue, the exemplary illustrative non-limiting protocol implementation favors timeliness over reliability by allowing for loss of data, thus providing a non-guaranteed, order sensitive level of service.

FIG. 1 shows an exemplary system that can be used to support such a protocol implementation and FIGS. 2A-2D show exemplary illustrative configuration screens that can be used to configure such a system.

As is shown in FIG. 1, an enterprise resources computer 102 and associated firewall 150 and internal router 152 can communicate via a network (e.g., Internet) 104 with a variety of different types of end user devices including for example branch office users 106, wireless users 108, hot spot users 110, and small/home office users 114. As discussed above, these various users may be able to roam from one network point of attachment to another. Exemplary technology herein may be used to provide virtual private networking as well as unreliable communications for real-time applications to the various users shown in FIG. 1.

The branch office users 106 may for example communicate via a branch router 116 over a local area network 118, and may operate or use a variety of different types of computers such as for example, laptop computers 120, desktop computers 122, printers or other peripheral devices 124 and servers 126.

Wireless users 108 may operate using, for example, the so-called "3G" carrier network 130 using a cellular phone or other radio infrastructure 128 supporting various protocols including for example HSBTA, EVDO, etc. The wireless users 108 may also operate a variety of different types of equipment including for example wirelessly-connected laptop computers 132, handheld or portable devices 134 or the like. Routers 136 may also be used in this context.

Hot spot users may connect their laptop computers 138 via a wireless local area network (WLAN) 140 that is similarly connected to network 104 via a router 143.

Small/home office users 114 may connect desktop computers 144, laptop computers 145, etc. to network 104 via a DSL or cable modem 148.

Example User Interface

Figure 2A:
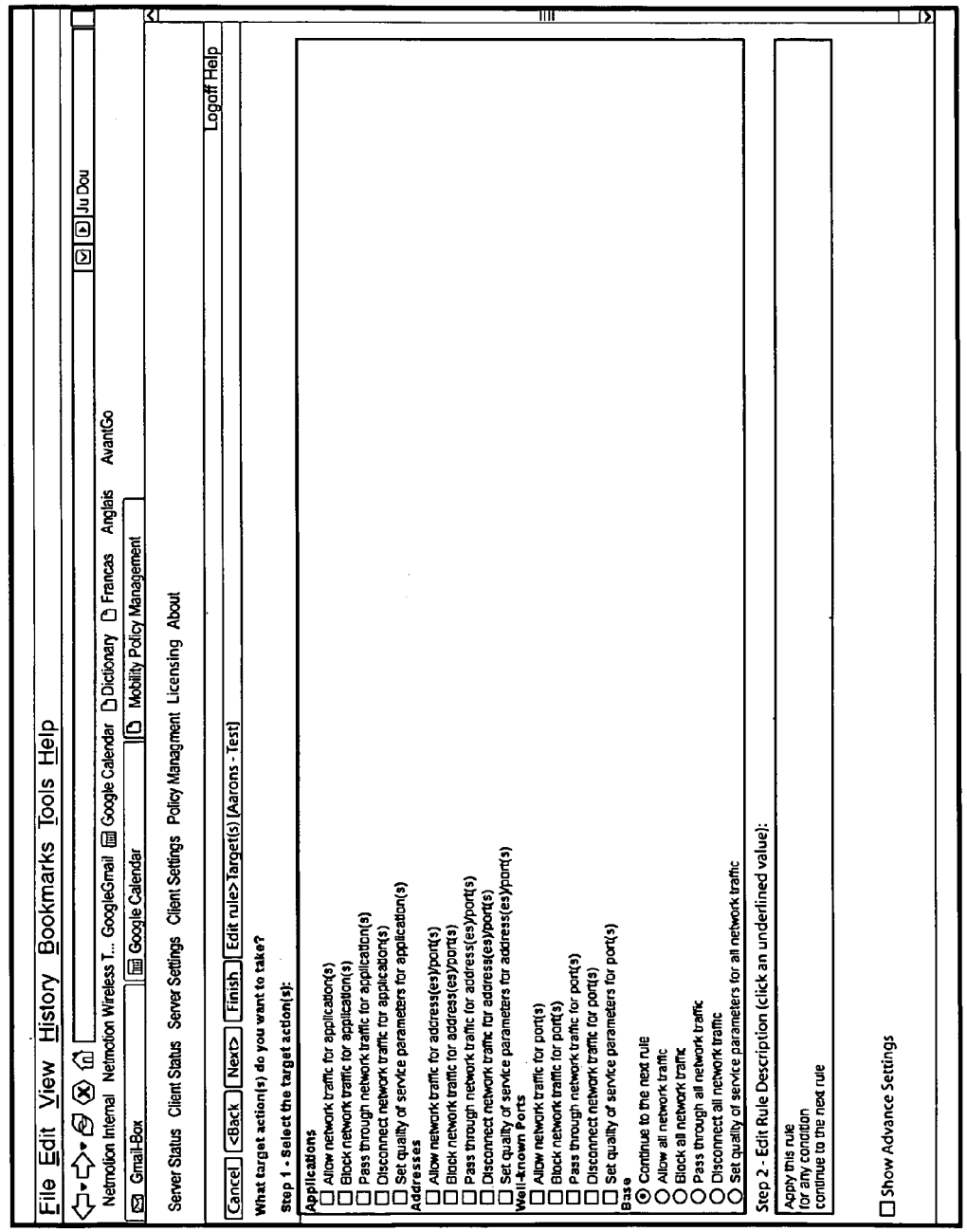
Figure 2D:
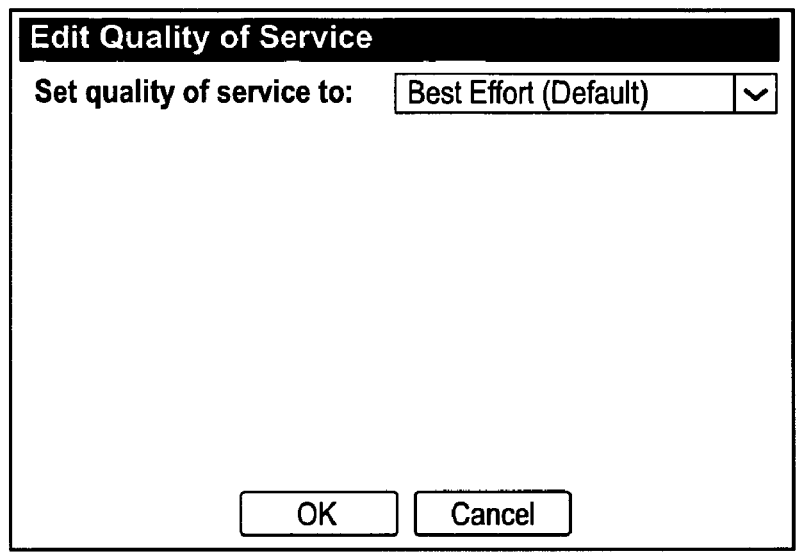

FIGS. 2A-2D show exemplary illustrative non-limiting user interface display configuration screens for use with the exemplary FIG. 1 system. FIG. 2A shows a exemplary illustrative non-limiting user interface screen that asks a user "what target action(s) do you want to take" and allows the user to select various target actions in terms of applications, addresses, well-known ports and base. Applications may include for example allowing or blocking network traffic for application(s), passing through network traffic for application(s), disconnecting network traffic for application(s), and setting quality of service parameters for application(s).

Addresses options may similarly include for example allowing or blocking network traffic for address(es)/port(s), passing through network traffic for address(es)/port(s), disconnecting network traffic for address(es)/port(s), and setting quality of service parameters for address(es)/port(s).

The "well-known ports" selection may allow users to for example allowing or blocking network traffic for port(s), passing through network traffic for port(s), disconnecting network traffic for port(s), and setting quality of service parameters for port(s).

Similarly, the "base" options may allow the user to continue to the next rule, allow all network traffic, block all network traffic, pass through all network traffic, disconnect all network traffic, and set quality of service parameters for all network traffic.

As will be understood, the "set quality of service" parameters on an application, address, port basis and for all network traffic provides features to allow settings to accommodate real time streams. In particular, the parameters under "set quality of service . . . " allows the setting of forward error correction and other parameters for real time applications.

FIG. 2B shows an exemplary illustrative "edit quality of service" subscreen that allows a user to set quality of service to various options including for example "high priority TCP application", "custom" (see FIG. 2C), "best effort" (default) (see FIG. 2D), options. Referring to FIG. 2B, when the user selects setting quality of service to "high priority TCP application", the user may select various parameters for type of service, datagram queuing and RPC FEC settings. The "type of service" options may include for example a traffic shaping priority. The "datagram queuing" allows the user to select a maximum time in queue in milliseconds as well as flush options. The RPC FEC settings allows the users to select the variable N and K as well as an RPC FEC coalesce time out in milliseconds.

If the user selects a "custom" quality of service, then the exemplary illustrative FIG. 2C user interface screen may allow the user to select a "DIFFSERV code point" option including for example "best effort" from a pull down menu, as well as a traffic shaping priority (e.g., voice, video, best effort, background and other traffic can be assigned priorities from 0-7 with 7 being the highest and thus given greater access to system resources and network bandwidth, with different priority traffic being placed into different queues), a maximum time in queue value in milliseconds, whether or not to "flush immediately." If the user selects "best effort" to set quality of service, then software algorithms described herein will attempt to optimize parameters including the ones shown in FIGS. 2B and 2C in order to achieve best results.

Example Frame Structures

Figure 3:
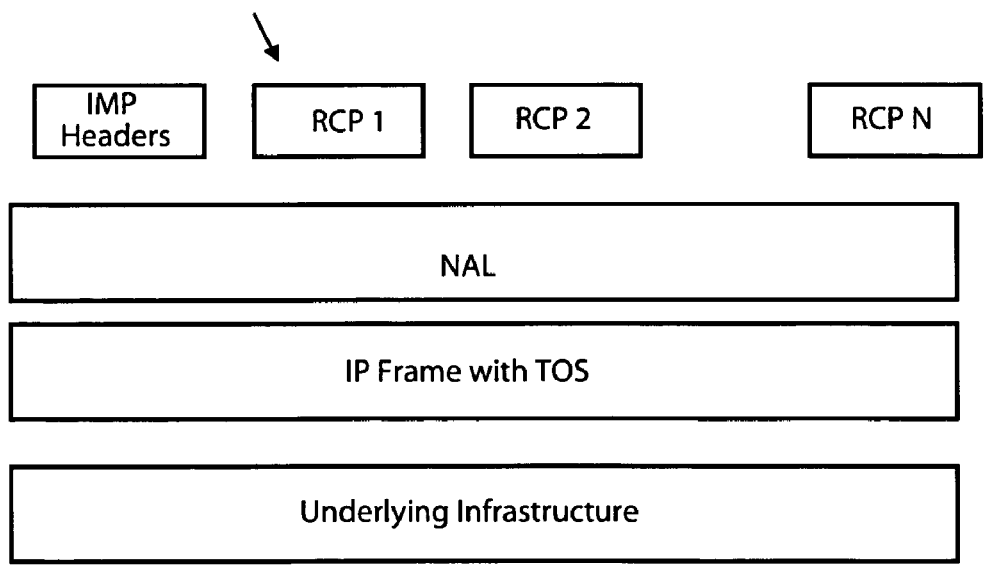
FIG. 3 shows an exemplary illustrative non-limiting infrastructure/architectural layer diagram.
Figure 3A:
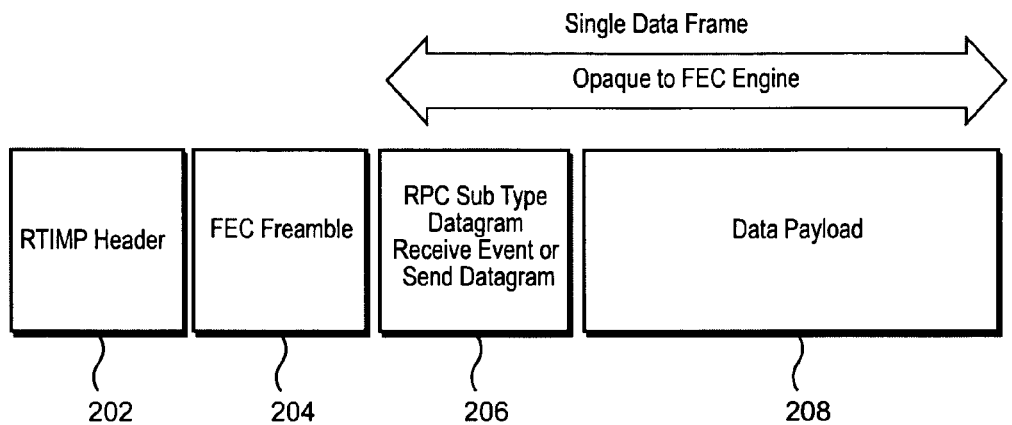
FIGS. 3A-3E show exemplary illustrative non-limiting frame structures.
Figure 3B:
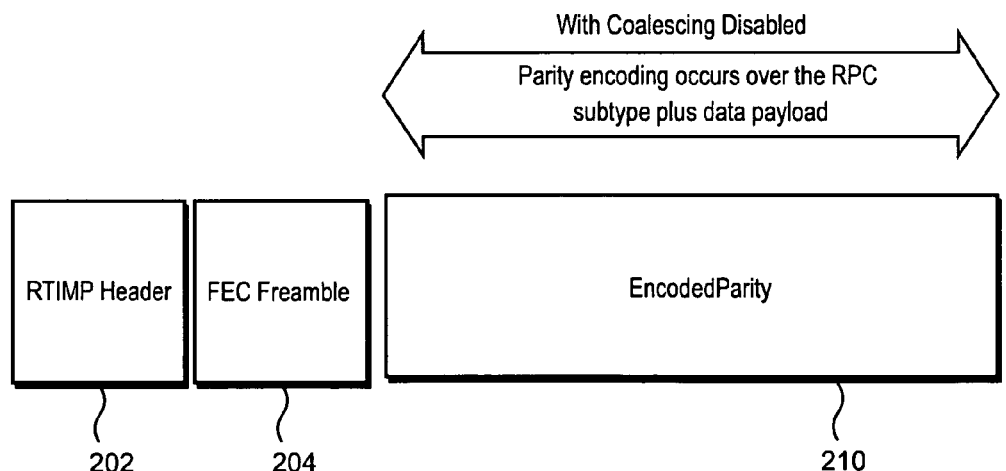
Figure 3C:
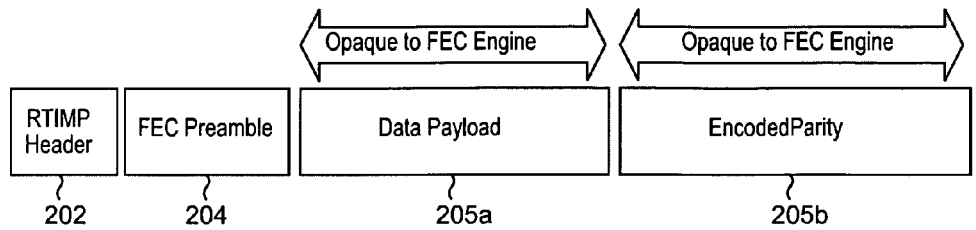

FIGS. 3A-3G show exemplary illustrative non-limiting data transmission frame structures. FIG. 3A shows an example frame structure for a single frame data; FIG. 3B shows an example frame structure for a single parity frame with coalescing disabled; and FIG. 3C shows an example frame structure with combined parity and data with coalescing enabled.

In the FIG. 3A example, the example frame structure for a single data frame may begin with a real time (RT) header 202 and may include a forward error correction (FEC) preamble 204 followed by a single data frame which is opaque to the forward error correction engine, the single data frame including an RPC subtype datagram receive event or send datagram 206 and a data payload 208.

An exemplary single parity frame structure shown in FIG. 3B includes the real time header 202 and FEC preamble 204 which is followed by an encoded parity portion 210. Parity encoding may occur over the RPC subtype plus data payload fields 206, 208.

FIG. 3C shows a still further example frame structure with coalescing enabled to combine both a data payload (see FIG. 3A) with an encoded parity field (see FIG. 3B).

Figure 3D:
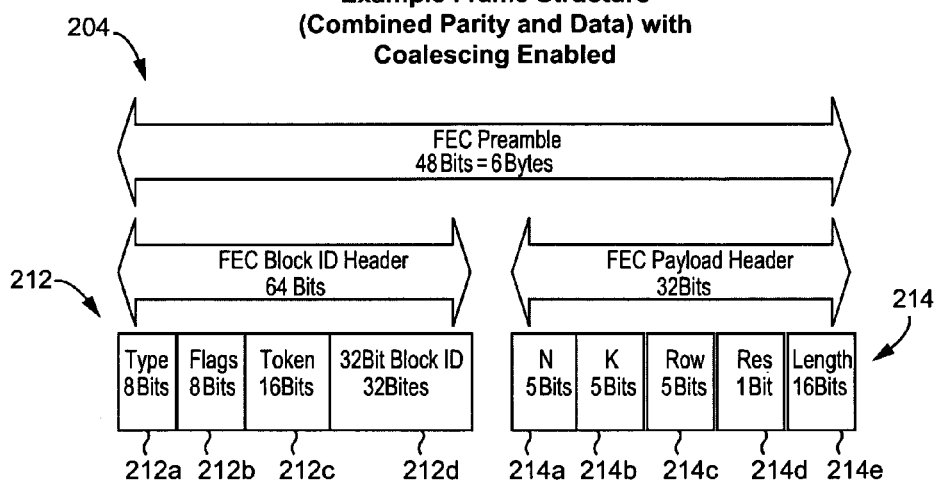

FIG. 3D shows an example FEC preamble with coalescing disabled of the type that may be used with the frame structure shown in FIGS. 3A, 3B. In this particular example, the FEC preamble may be 48 bits (6 bytes) long and may include an FEC block ID header (64 bits) 212 and an FEC payload header (32 bits) 214. The FEC block ID header 212 in turn may include a type field 212A, flags 212B, a token 212C and a block ID 212D. The FEC payload header 214 may specify N (field 214a), K (field 214b), a row (214c), RES (214d) and length (214e). N is the number of total packets per block, K is the number of data packets per block, and "row" is the row of the encoder matrix identifying packet. The "block ID" may be a value identifying the block for the specific packet, and "token" may be a value defining a specific FEC flow. As will be understood, the "flags" field 212b may indicate whether the payload is a data packet, a parity packet, or whether the packet contains a coalesced data plus parity packet; whether FEC is disabled, block decode failure, receive error, encoder disabled, and testing.

Figure 3E:
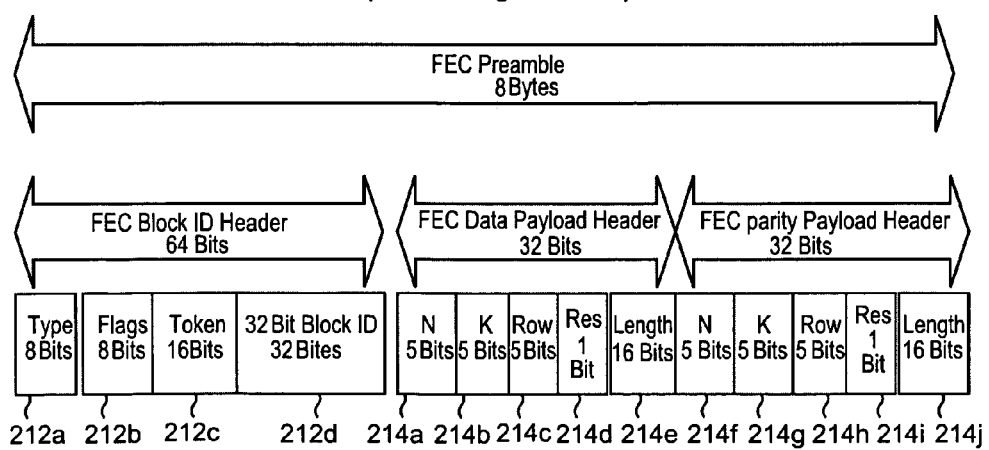

An extended example FEC preamble of the type that may be used with the FIG. 3C example frame structure with coalescing enabled is shown in FIG. 3E to include two sets of FEC header parameters, one for the data payload and the other for encoded parity 205b. Note that as shown in FIG. 3E, when data and parity are coalesced together into a single packet, N, K and Row appear twice. This exemplary design thus permits for N and K to vary from packet to packet and block to block. Since coalesced parity packets are from a previous block and it is desired to be able to vary N, K as network conditions change on a per block basis, additional send bandwidth is used for coalesced packets to add flexibility.

Figure 3F:
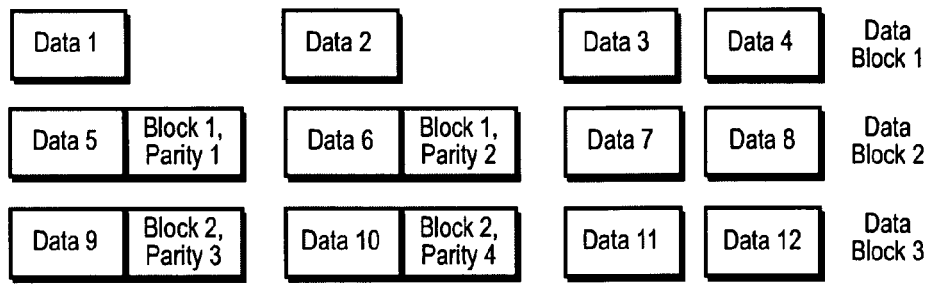
FIG. 3F shows an exemplary comparison of coalescing enabled and disabled.
Figure 3F:
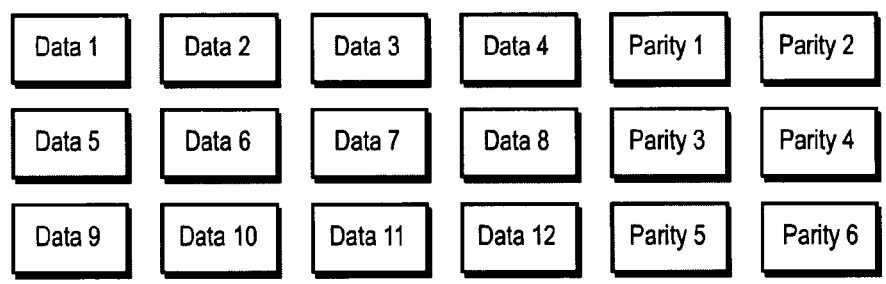
Figure 3G:
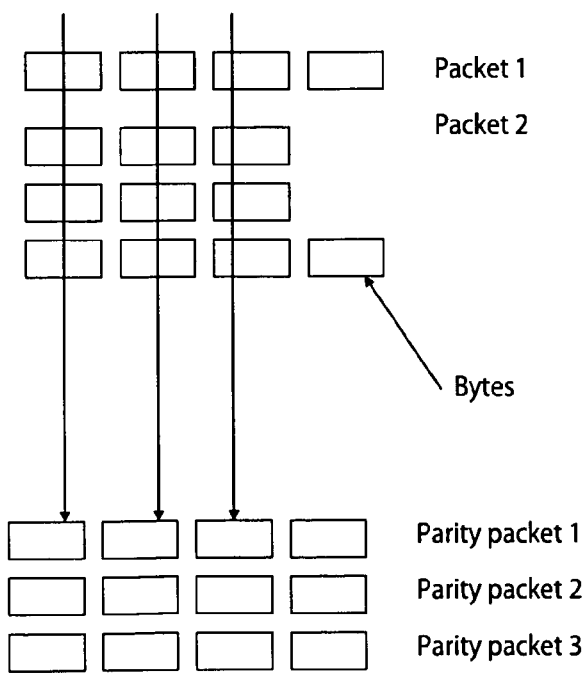
FIG. 3G shows exemplary encode and FEC bandwidth optimization bytes.

FIG. 3F compares frame structures without and with coalescing. When set to 0, coalescing is disabled and parity packets immediately follow the last RPC in each RS block. When set to a non zero value, parity packets from block N−1 are coalesced with data packets in block N when sending to the network peer. If data packets do not arrive within the coalesce timeout, all remaining parity packets for the last data block can be sent to the peer without coalescing.

Thus, for a 6,4 code, coalescing reduces the number of packets per block from 6 to 4. If coalescing latencies adversely affect application performance, setting the timer to 0 disables coalescing and parity packets are sent immediately following their associated data packets.

Coalescing in the exemplary implementation only occurs if the combined size of the RPC and parity packets to be coalesced is less than the maximum MTU size as reported by the RTIMP layer to the RPC FEC module.

Exemplary Frame Sequencing

Frame construction sequencing is shown in FIGS. 3D, 3E. As each frame is built, a unique identifier is assigned to it. Since the exemplary illustrative non-limiting protocol implementation does not use an acknowledgement algorithm to guarantee delivery, the standard sequence/acknowledgement fields are combined into a single identification field allowing for up to, by way of example without limitation, a 64 bit sequence number, allowing out of order detection. The size of the field also ensures that the number won't wrap for a single session in the lifetime of this product even at a rapid rate such as for example over 1 million packets per second (e.g. 1 per microsecond):

$$(2^{63})/(1000000 \text{ packets}*60 \text{ seconds}*60 \text{ minutes}*24 \text{ hours}*365 \text{ days})=292{,}471.209 \text{ years}$$

This sequence number is, in one exemplary illustrative non-limiting implementation, randomly seeded and increases monotonically as subsequent packets are sent. Since the loss of any data is expected to handle by higher layers, the exemplary illustrative non-limiting protocol implementation does not employ a retransmit algorithm. This allows for the repurposing of the frame ID field if necessary. Notwithstanding the repurposing of the fields mentioned above, maintaining compatibility with the existing previous legacy frame format is useful in one exemplary illustrative non-limiting implementation. Additional fields can be added after the standard header if necessary.

To support the frame structures described above, the exemplary illustrative implementation defines an exemplary illustrative 128 bit counter. The table below follows the C++ bit-field convention. To conserve bandwidth, the several bits of the counter are used as part of the RPC FEC protocol. typedef struct tagCTR_MODE_BITFIELD.

| Type | Name | Number of Bits | Comments |
|---|---|---|---|
| Uint32_t | RTIMP | 32 | Temporary name reserved for RTIMP use. Supplied by RTIMP. |
| Uint32_t | BlockId | 32 | Block identifier |
| Uint64-t | GlblEncrCntr | 48 | Monotonically Increasing (Unique) |
| Unit64_t | CodecN | 5 | Block sizes of up to 32 packets |
| Uint64_t | CodecK | 5 | Up to 32 RPC packets |
| Uint64_t | CodecRow | 5 | Location in vandermonde matrix used to generate packet |
| Uint64_t | CodecReserved | 1 | Unused |

One of the expected usage case for the exemplary illustrative non-limiting protocol implementation is with unidirectional traffic flows, such as those found with streaming audio (VOIP) or video communications. This places special requirements, especially in roaming situations where there may not be any reverse direction feedback mechanism to detect upstream disruptions. Although some prior protocols could use an acknowledgement scheme to detect the unreachability of its peer, unidirectional flows do not generate these responses. An exemplary illustrative non-limiting protocol implementation leverages various features to alleviate this problem. Since, in one exemplary illustrative non-limiting implementation, an Update_Interface_Notification frame is transmitted every time the MES roams, information to detect changes in location can be handled. There is still a potential issue in determining upstream disruptions in a timely fashion (NAT timeout, etc). A keep-alive mechanism could solve this issue, or other possible solutions may be used instead.

Exemplary Architectural Considerations

The exemplary illustrative non-limiting implementation supplies components useful for secure loss-full datagram type service. An exemplary illustrative non-limiting implementation is available once a session is instantiated. Multiple RPC protocol blocks and an IMP header block can be supported above on NAL, IP Frame with TOS and underlying infrastructure. As shown in FIG. 3, once session tokens and parameters have been negotiated between peers, the protocol level above (RPC) can request that loss tolerant application data be sent over a sideband channel that is associated with the parent session.

In general, in one exemplary implementation:

Policy enforcement decisions regarding the use of IMP (ARQ) or RTIMP (FEC) occur when sending. For the client this is the Send Datagram Request. On the server this is the Receive Datagram Event.

RPC FEC packets are forwarded to the dispatcher for prioritization before sending (this assumes a traffic shaping dispatcher is added to the client).

The UI is integrated into the existing Policy UI

The existing service parameters RPC and paradigm is extended to permit the client to provide the server with policy configuration.

Parity encoding begins at the RPC subtype field to protect payload length. Source and destination addresses, and address object fields.

The RPC FEC module provides recovered data to the RPC layer using standard RPC callbacks as defined by the RPC parser module. On the client it calls the Receive Datagram Event callback. On the server it calls the Send Datagram Request callback.

The RPC FEC module asks the RTIMP/IMP module to report the maximum MTU size for the purposes of coalescing when EC Coalescing is enabled. Coalescing does not occur if the RPC and parity to be coalesced exceed this value.

A work type for sending to the RTIMP layer WRK_TYPE_NCP_SEND_RTIMP is defined

A work type for receiving from the RTIMP WRK_TYPE_RPC_RECEIVE_RTIMP is defined.

WRK_TYPE_NCP_SEND_RTIMP and WRK_TYPE_RPC_RECEIVE_RTIMP include fields to supply the 128 bit counter values.

The example protocol is a symmetric protocol and thus the design is shared between the client and server. The RPC FEC packets are encapsulated within RTIMP packets. RTIMP uses AES counter mode to encrypt and decrypt RPC FEC packets. With the exception of the 32 bit field named RTIMP, RPC FEC supplies RTIMP with the counter values for each RPC FEC packet that is transmitted. Secure transmission is provided in one example implementation by a 128 bit AES counter that does not wrap for a single key utilized in counter mode operation. The RPC FEC engine ensures that the 48 bits field is always unique. 48 bits provides enough space to ensure wrap never occurs.

These fields are supplied in WRK_TYPE_NCP_SEND_RTIMP and WRK_TYPE_RPC_RECEIVE_RTIMP work requests.

More details appear below in connection with FIG. 4 and following.

Exemplary Send Path Processing

Figure 4:
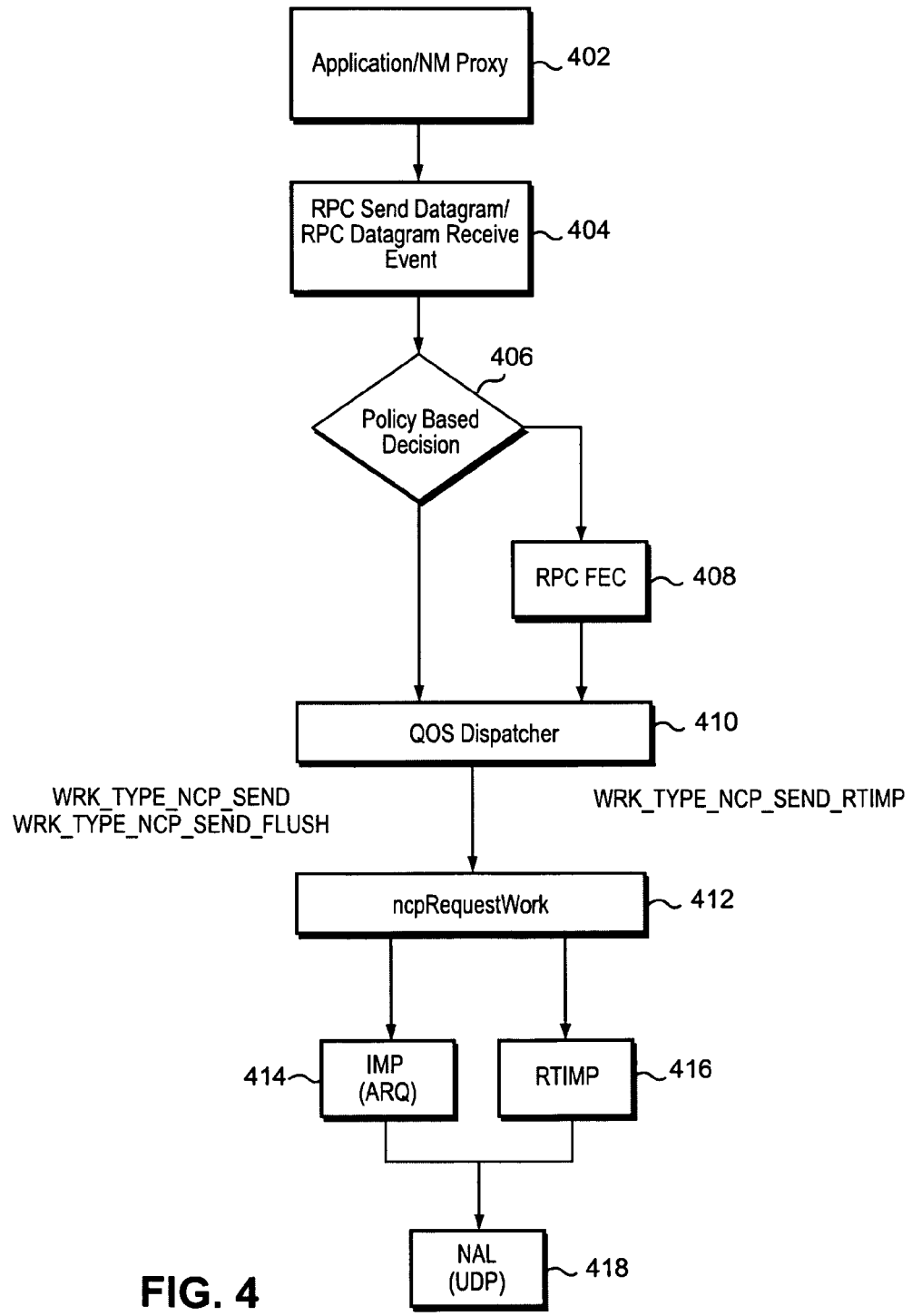
FIG. 4 is a flowchart of an exemplary illustrative non-limiting client/server send process.

FIG. 4 shows an exemplary illustrative non-limiting client/server send routine. An application/NM proxy (block 402) is used to request a send datagram/datagram receive event (block 404). A policy based decision (406) to use FEC (block 408) may be made at the client based on application, address, port or the like. A quality of service dispatcher (block 410) may perform a "send" or "send_flush" or a "send_realtime" as indicated.

Communications between the upper layer (RPC) and the exemplary illustrative non-limiting protocol implementation can be accomplished though a standard work request mechanism already in place between the two components. As shown in FIG. 4, three additional work request types may be implemented.

1) WRK_TYPE_NCP_RTIMP_RPCFEC_FLOW_NOTIFY

The upper layer will alert the system that it is about to instantiate or terminate a real time application protocol flow. This allows the system to allocate/deallocate the necessary resources need to communicate with its associate peer using real time application frames.

2) WRK_TYPE_NCP_SEND_RTIMP

The upper layer will generate this work request type when it would like to have the associated data sent using the sideband channel.

3) WRK_TYPE_RPC_RECEIVE_RTIMP

The exemplary illustrative non-limiting protocol implementation layer will generate this work request when it receives a real time application frame. Sequence information will be passed up to the layer above so it can deal with ordered delivery of the received data. Through the use of these work requests, the exemplary illustrative non-limiting protocol implementation will communicate the provided application data using real time application framing.

The "ncp request work" block 412 then routes the datagram(s) to be sent based on whether they are to be sent with high level reliability and acknowledgments (block 414) or whether they are to be sent using the real time lower reliability protocol described herein (block 416). An NAL protocol engine (using for example UDP) may be used to actually send the frames (block 418).

In the exemplary implementation, the ncpRequestWork/ncpProcessWork work dispatcher 412 functions handle:
WRK_TYPE_RTIMP_OPEN_FLOW
WRK_TYPE_RTIMP_CLOSE_FLOW
WRK_TYPE_NCP_SEND_RTIMP
WRK_TYPE_NCP_RTIMP_RPCFEC_FLOW_NOTIFY This work request alerts the IMP layer that RPC is about to instantiate or terminate a RTIMP flow. This allows IMP to allocate/deallocate any necessary resource required to frame the subsequent application data associated with this flow in RTIMP frames. To determine which type of event is taking place, the work request includes a pointer to a WRK_RTIMP_FEC_FLOW_NOTIFY structure. As part of this structure, a field named "activity" will either be set to FEC_ACTIVITY_FLOW_CREATED or FEC_ACTIVITY_FLOW_DELETED based on the type of work being requested. Initially this will just increment/decrement a counter of the number of simultaneous flows that are to be generated as no additional resources are dynamically allocated. If the counter is equal to zero, all further processing of RTIMP frames will be discarded upon reception.

In some exemplary implementations, there may be some additional parameters passed as part of this structure to allow further prioritization (token bucket rate, etc.) of the application data depending on where traffic shaping is implemented.

In the example implementation, the work request WRK_TYPE_NCP_SEND_RTIMP is used to queue application data that RPC would like encapsulated in RTIMP framing. To simplify the changes necessary at the RPC layer to implement this new functionality, the standard WRK_NCP_SEND structure has been modified to now account for RTIMP specific information. More specifically, a new countermode structure and ToS field can be included:

```
// Work types WRK_TYPE_NCP_SEND,
WRK_TYPE_NCP_SEND_FLUSH, and
WRK_TYPE_NCP_SEND_SIMP
// all use this same structure. CHANGING THAT FACT WILL BE
PAINFUL!
typedef struct_TAG_WRK NCP_SEND_ {
PNCP_HANDLE          ncpHandle;    // opaque request handle from
calling entity (RPC)
PRPC_HANDLE          rpcHandle;    // opaque request handle from
calling entity (RPC) - for debug
DWORD                expiryTime;   // expire work request if not processed by
this time
DWORD                flags;        // send flags
DWORD                retryCount;   // max times unreliable data should be (max 255)
                                   // retransmited 0 = default
```

```
//*********************************************
                                    // new RTA stuff
DWORD                 TOSValue;      // type of service value for sending
this particular request
CTR_MODE_BITFIELD     CtrValues;     // values for the optional
encryption CTR mode counter
                         //***************************************
DWORD                 TotalUserDataLength;  // entire length of user Data
(all fragments) - max 65535
DWORD                 UserDataLength;       // length of first fragment of user
data pointed to by pUserData
PBYTE                 pUserData;            // pointer to first fragment of user data
}WRK_NCP_SEND, FAR * PWRK_NCP_SEND;
```

The CounterMode Bit Field structure is used to allow IMP and the RPC layer to share sequencing information for order sensitivity and to eliminate protocol overhead.

If the counter of RTIMP flows is equal to zero, this request will be completed with the error status of _NCP_STATUS_RESOURCE_FAILURE_.

Figure 5:
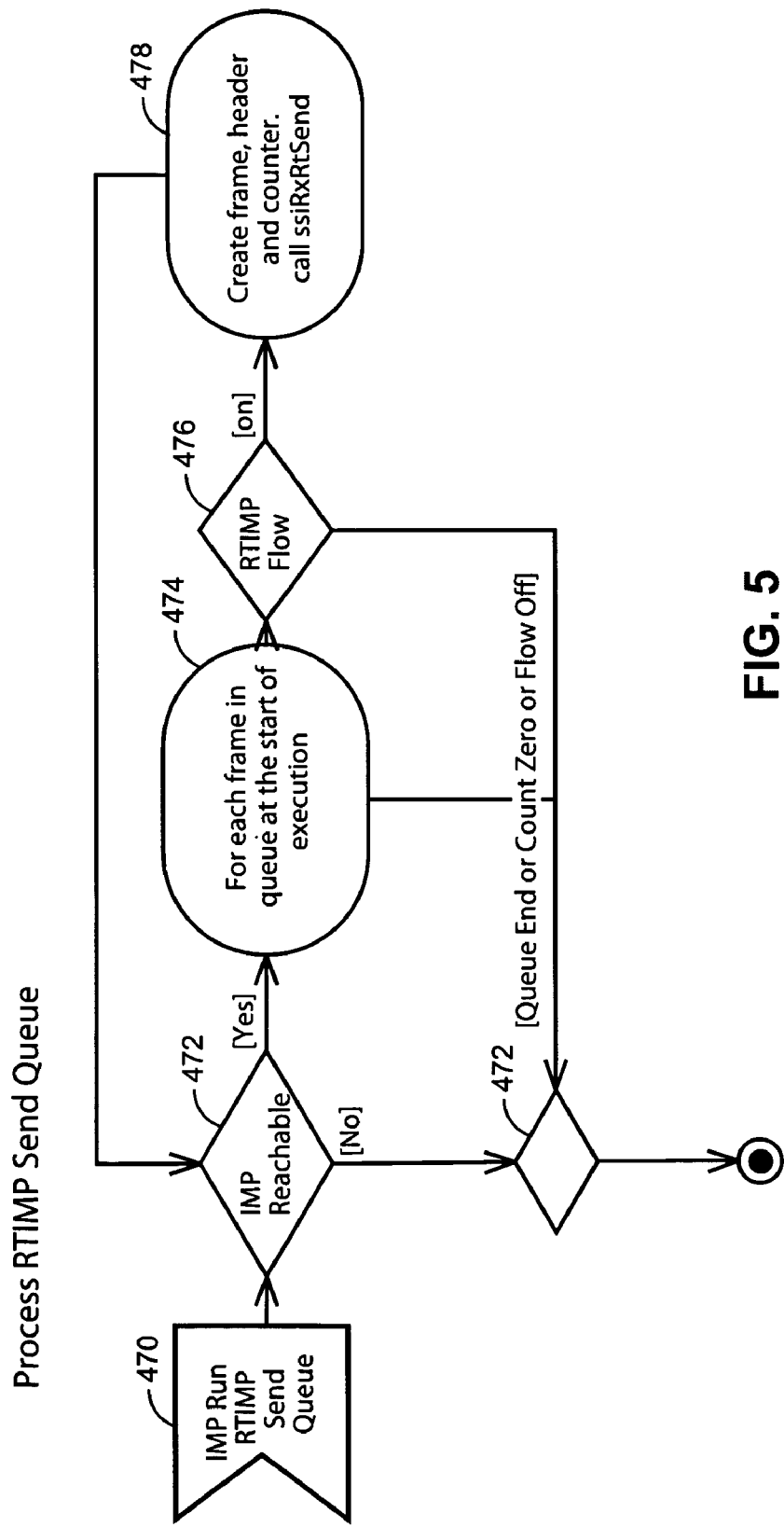
FIG. 5 shows a non-limiting illustrative real time RTIMP send queue process.
Figure 7:
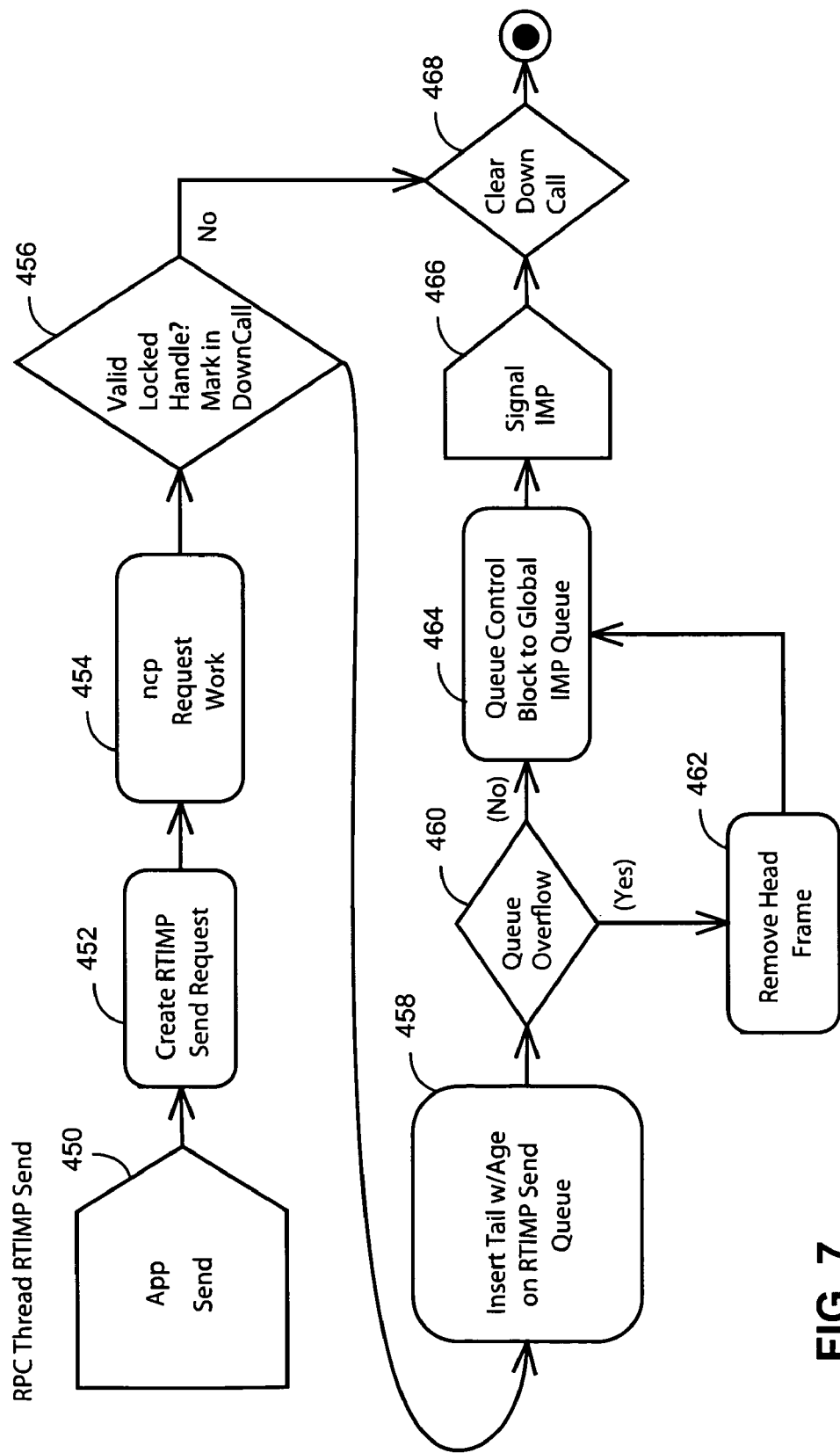
FIG. 7 shows a non-limiting illustrative RPC thread RTIMP send process

FIGS. 5 and 7 show more detailed exemplary processing for sending work to the real time protocol.

FIG. 5 shows an exemplary illustrative non-limiting process RTIMP send queue. The RTIMP send queue is serviced after being queued to run by the RPC RTIMP send request (block 470). The IMP thread will process the RTIMP queue if the connection is not truly unreachable (via time out for example). This queue will be processed even if the main protocol is not eligible to send (e.g., due to window full) (decision block 472). Assuming the queue is not empty, the current queue count may be saved, and counters may be checked that track the number of frames that have not yet been processed. Provided that the control block is not RT flow controlled (block 476), it will process only the number of send requests existing at the start of the queue service to avoid monopolization of the IMP thread by the RPC thread sends. For each send request, the IMP thread may remove the request, create the frame with header and counter and then call a send routine (block 478).

Referring for example to FIG. 7, when an application sends a datagram (block 450), a real time send request is created (block 452) and an ncp request work request is generated (block 454). If the request has a valid locked handle (decision block 456), then it is marked in down call and is inserted into the RTIMP send queue with age (block 458) (which will cause the frame to be completed and freed if it expires while still on the queue). If there is a queue overflow (decision block 460), then the entry is dropped (block 462). Otherwise, the queue control block to global IMP queue functionality is performed (block 464), the IMP functionality is signaled to send the datagram (block 466) and the down call is cleared (block 468).

In more detail, upon the ncpProcessWork function shown in FIG. 7 receiving a WRK_TYPE_NCP_SEND_RTIMP request validates that the IMP control block and session are still valid. To limit execution time spent on the caller's context (RPC), if the associate session is valid, the request is queued to the sRTIMPTxWorkRequestQueue of the IMP control block. In the exemplary implementation, the sRTIMPTx-WorkRequestQueue is depth guarded and if the maximum depth is overflowed, a head-end discard mechanism is used to flush stale data. The stale work request at the head of the queue is removed and completed as though no error occurred (_NCP_STATUS_SUCCESS_). The control block is then placed on the global IMP work queue for further processing on the IMP thread and control returned to the caller.

Once the IMP thread is scheduled, the eligible control block is removed from the global queue and then any work scheduled for the session is processed. Ultimately the processNcpSendQueue function is called. If the IMP session is in STATE ESTABLISHED and allows for application data to be transferred, the processRTIMPQueue( ) function is called to determine if any RTIMP work is to be processed prior to any standard IMP traffic. If work is found, the application data is then removed from the queue, encapsulated in RTIMP header and queued to the NAL layer for subsequent transmission. A ciphering process may be added prior to transmission. As a potential optimization, it is possible that multiple WRK_TYPE_NCP_SEND_RTIMP requests may be coalesced into a single RTIMP frame. A configurable counter is set to one to ensure that there is a one to one correlation between work requests and RTIMP frames.

Exemplary Receive Path Processing

Figure 6:
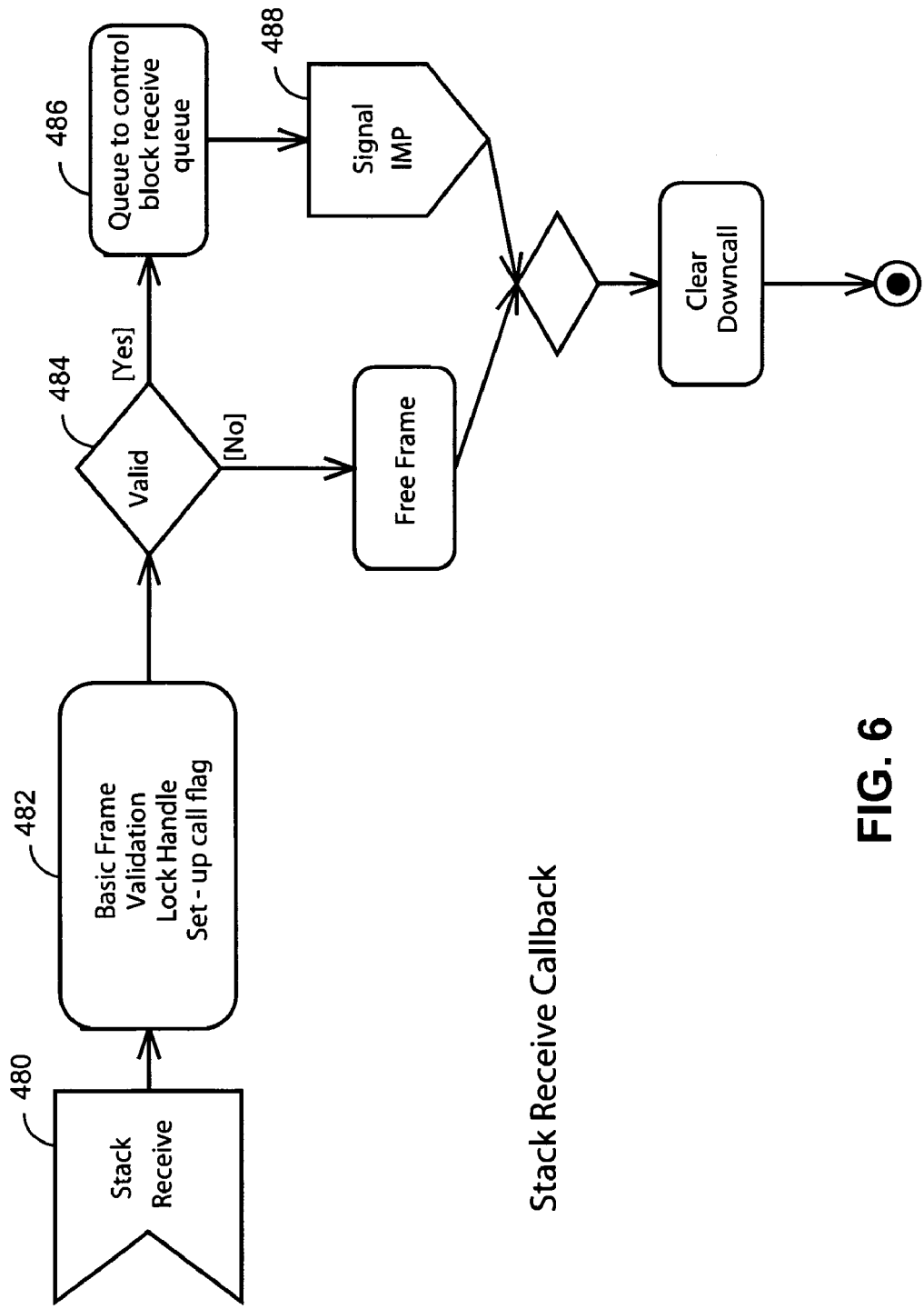
FIG. 6 shows a non-limiting illustrative stack receive callback process.
Figure 8:
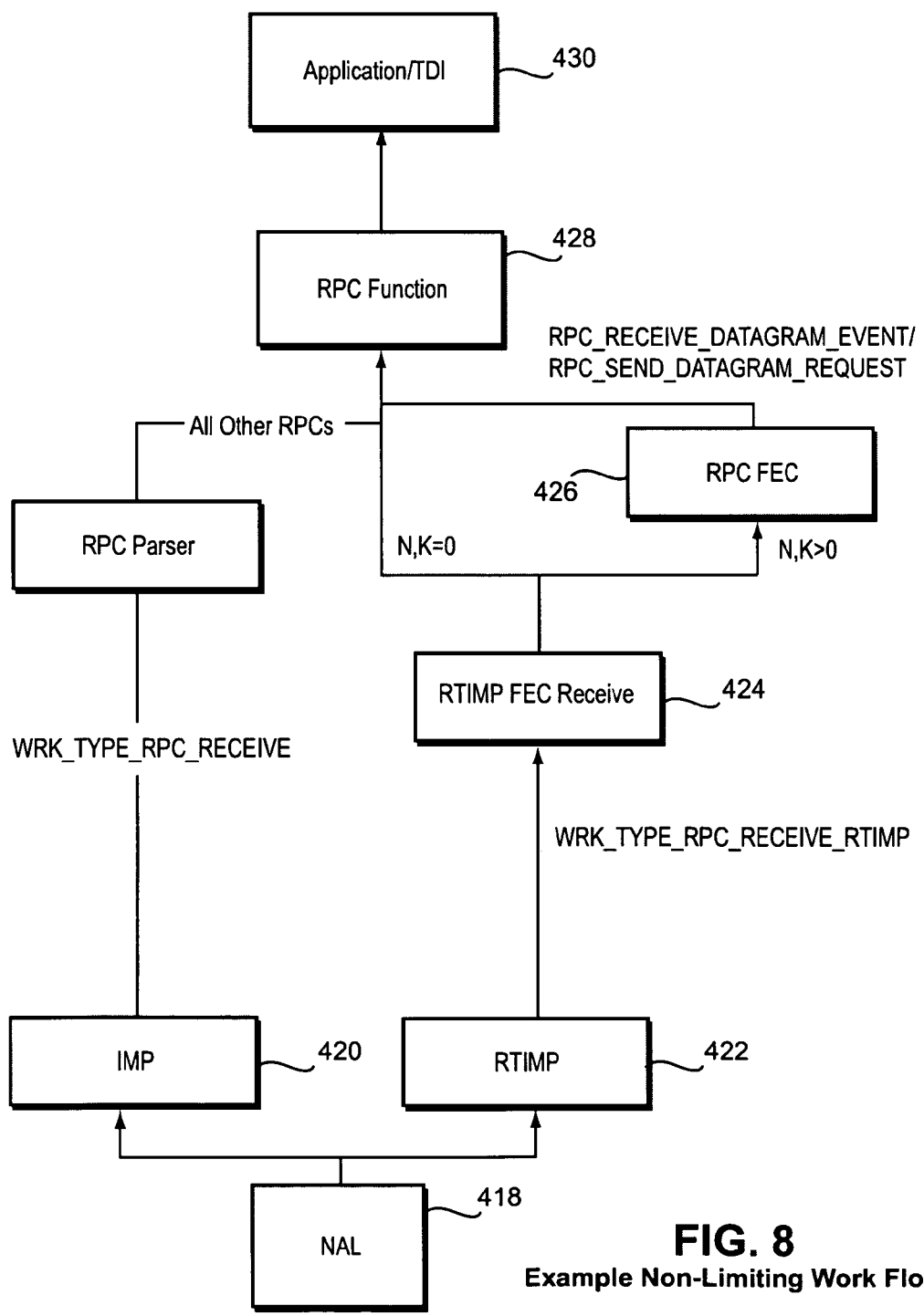
FIG. 8 schematically illustrates an exemplary non-limiting receive workflow.

FIGS. 8 and 6 show an exemplary illustrative non-limiting work flow used by client and server to receive real time datagrams. As shown in FIG. 8, the NAL layer 418 presents the received datagrams to the normal guarantee-reliable handling block 420 or to the real time block 422 depending upon the headers in the frames as discussed above and shown in FIG. 3 and following. If a real time datagram has been received, the datagram is handled by the real time FEC receive block 424 which handles it differently depending upon the values of N, K. In particular, if N, K>0, the datagram is processed by the forward error correction block 426. If, on the other hand, N, K=0, the received datagram bypasses the forward error correction block 426. Either way, received datagrams are sent on to the RPC function block 428 and to the application 430. In the example shown, on the client the parser calls RPC with RPC_receive_datagram_event which provides the data to the application, whereas on the server the parser calls RPC_send_datagram_request which calls TDI to send the datagram to the application.

Real time RTIMP frames thus will be received over the same port/address pair as standard IMP traffic. This simplifies modifications to the code path and allows RTIMP to leverage all of the roaming capabilities of the core protocol. When an RTIMP frame is received from the NAL layer, it is passed on to IMP for further processing. To limit execution time spent on the receive interrupt context, the frame is passed to the existing validation routine for cursory determination of acceptability. If the received frame passes the first phase of validity it is placed on the standard receive queue sNC-FramesReceived within the IMP control block for that session. The control block is then placed on the global IMP work queue for further processing on the IMP thread.

Once the IMP thread is scheduled, the eligible control block is removed from the global queue (see FIG. 6) and then any work scheduled for the session is processed. Received packets have implied precedence and is the first queue that is looked at—routine ncpProcessReceiveQueue is called. The received RTIMP frame is then removed from the sNCFramesReceived queue of the sessions control block and passed to the validateNcpFrame( ) function. If the frame passes integrity and validity checks, the frame is passed to frame parser. If an error is detected, the frame is summarily discarded.

The frame parser looks for and processes any optional fields potentially found in the frame such as control information, then dispatches the frame to the specific routine for the given frame type, in this instance an RTIMP frame or enqueueNcpRTIMPFrame( ) (see FIG. 6 block 488). This routine then changes the work request type of the frame to WRK_TYPE_RPC_RECEIVE_RTIMP and queues it for subsequent delivery to the RPC layer via the existing rpcRequestWork function. A deciphering process can be added prior to delivering the application to the RPC layer.

Example Class Relationship

Figure 9:
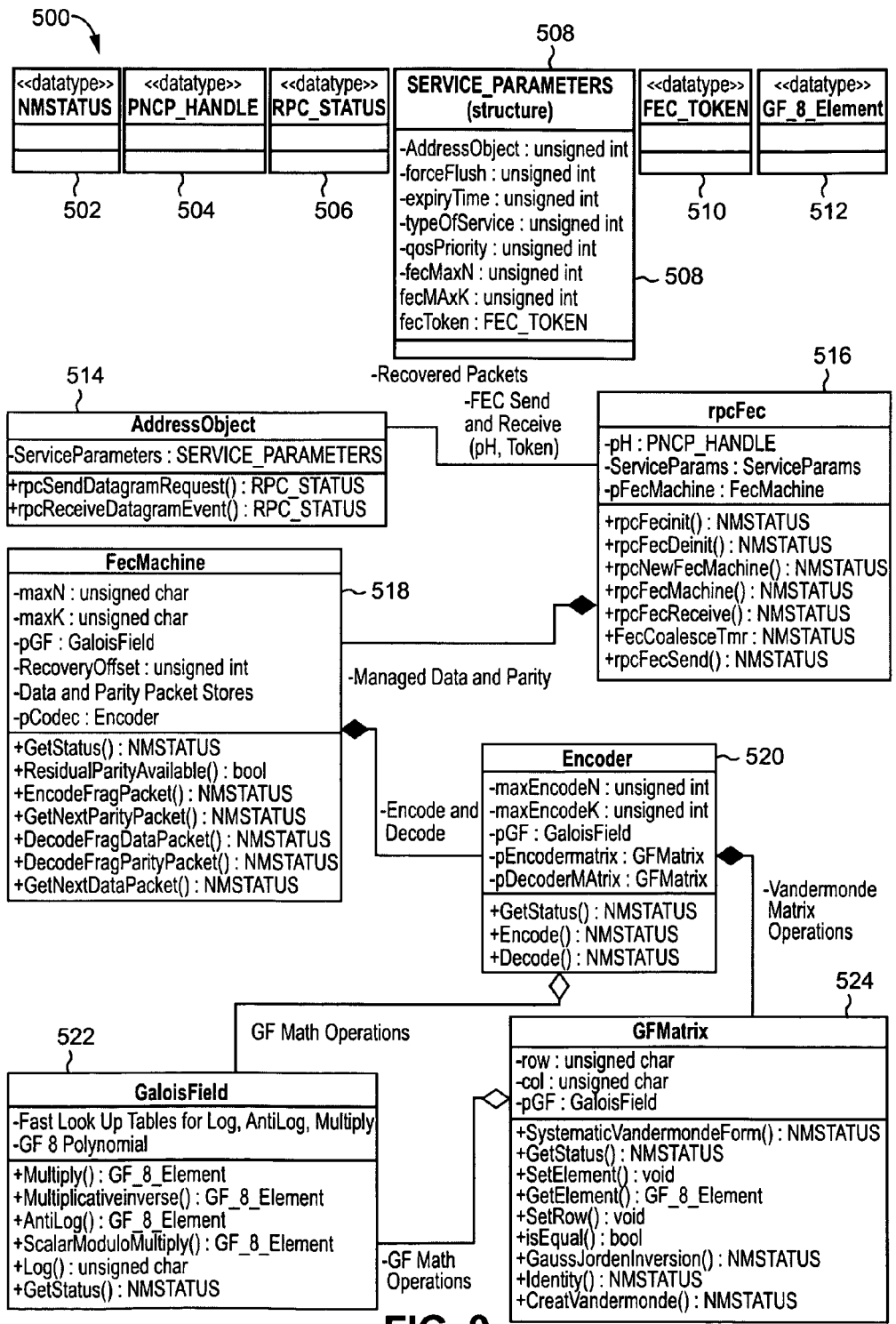
FIG. 9 shows an example illustrative non-limiting class relationship.

FIG. 9 shows an example Class Relationship diagram showing the relationship between object classes utilized in the design. Each exemplary illustrative class is described below.

Legacy Type Definitions Used

NMSTATUS 502, PNCP_HANDLE 504, and RPC_STATS 506 are exemplary legacy types defined within the Mobility code base.

FEC_TOKEN 510

A uint16_t value representing an EC dataflow.

GF_8_ELEMENT 512

A unit8_t value representing numbers in a Galois Field

SERVICE_PARAMETERS 508

A structure containing the Address Object 514 handle and its associated quality of service parameters. These parameters are sent from the server to the client as policies using a legacy policy paradigm. Once policies are evaluated at the client, the client returns this structure to the server in the ServiceParms RPC using RPC_TYPE_SERVICE_PARAMETER.

All of these parameters are shared between the client and server.

Service parameters example parameters include:

ForceFlush

When set to true, datagram coalescing over the legacy IMP is disabled

ExpiryTIme

Time to leave datagrams in the IMP queue before they are deleted typeOfService

DIFSERV Code Points in the Ip header TOS field qosPriority

Traffic shaping priority fecMaxN

Total number of packets including parity plus data. If both fecMaxN and fecMaxK are non zero and valid, a Vandermonde matrix based RS erasure code is employed for the transfer of datagrams between the client and server.

fecMaxK

Total number of data packets per RS block. See fecMaxN.

fecToken

Handle to FEC session. This handle is shared between the client and server and when combined with the RTIMP handle is the unique identifier for the data flow.

ADDRESSOBJECT 514

A legacy address object. Only the RPC FEC relevant information is shown here.

Exemplary Address Object Parameters

ServiceParameters contains the service parameter values for this address object instance as defined in this document.

rpcSendDatagramRequest is the legacy method for sending datagram RPCs from the client to the mobility server.

rpcReceiveDatagramEvent is the legacy method for sending datagrams from the mobility server to the client.

RPCFEC 516

This object serves two purposes in the exemplary implementation. First it is the C wrapper around the FECMACHINE C++ object and second it provides the conversion from generic mobility frags and work requests to the RPC protocol. This is the only object that understands the RPC frame structure in the exemplary implementation. There is a 1-1 mapping of AddressObjects to rpcFec objects. There is a 1-1 mapping of rpcFec objects to FecMachine objects.

rpcFecInit and rpcFecDeinit are called by the RPC subsystem once at system at startup and shutdown to initialize and deinintialize RPC FEC specific paramters.

rpcFecNewFecMachine is called when a new RPC FEC flow is created. This creates an FecMachine object and binds it to the FecToken and RTIMP handle.

rpcFecDeleteFecMachine deletes the object and binding rpcFecSend processes the RPC either SendDatagramRequest on the client or ReceiveDatagramEvent on the server, performs required encoding and sends the RPC to the peer using RTIMP.

rpcFecReceive handles incoming RPCs and parity packets, performs any necessary decoding required as a result of lost packets and forwards received and recovered RPCs to the AddressObject callback methods RecieveDatagramevent on the client and SendDatagramRequest on the server.

FECMACHINE 518

The object created by the rpcFec object. It in turn creates one encoder object 520. FecMachine 518 manages receive block IDs and sequence numbers, puts packets in order, and recovers lost packets using the encoder when packets are not received in sequence.

ENCODER 520

Created by the FecMachine 518 to encode and decode lists of work requests with possibly multiple frags. The encoder 529 uses two instances of the GFMatrix 524 object to perform matrix multiplication and division during the encoding and decoding processes respectively.

GFMATRIX 524

The object that performs all matrix operations over the Glaois Field. Division is performed using Gauss-Jordon Inversion. The Object also creates the Vandermonde matrices required for encoding and decoding.

GALOISFIELD 522

The object used to perform all math operations using the Galois field. This includes addition, multiplication, and division. There is only one object that is shared by all instances of the encoder and GFMatrix objects in the example implementation. These operations are accomplished using logs, antlogs, and multiplicative inverses.

Example RPC FEC Startup Sequence

Figure 10:
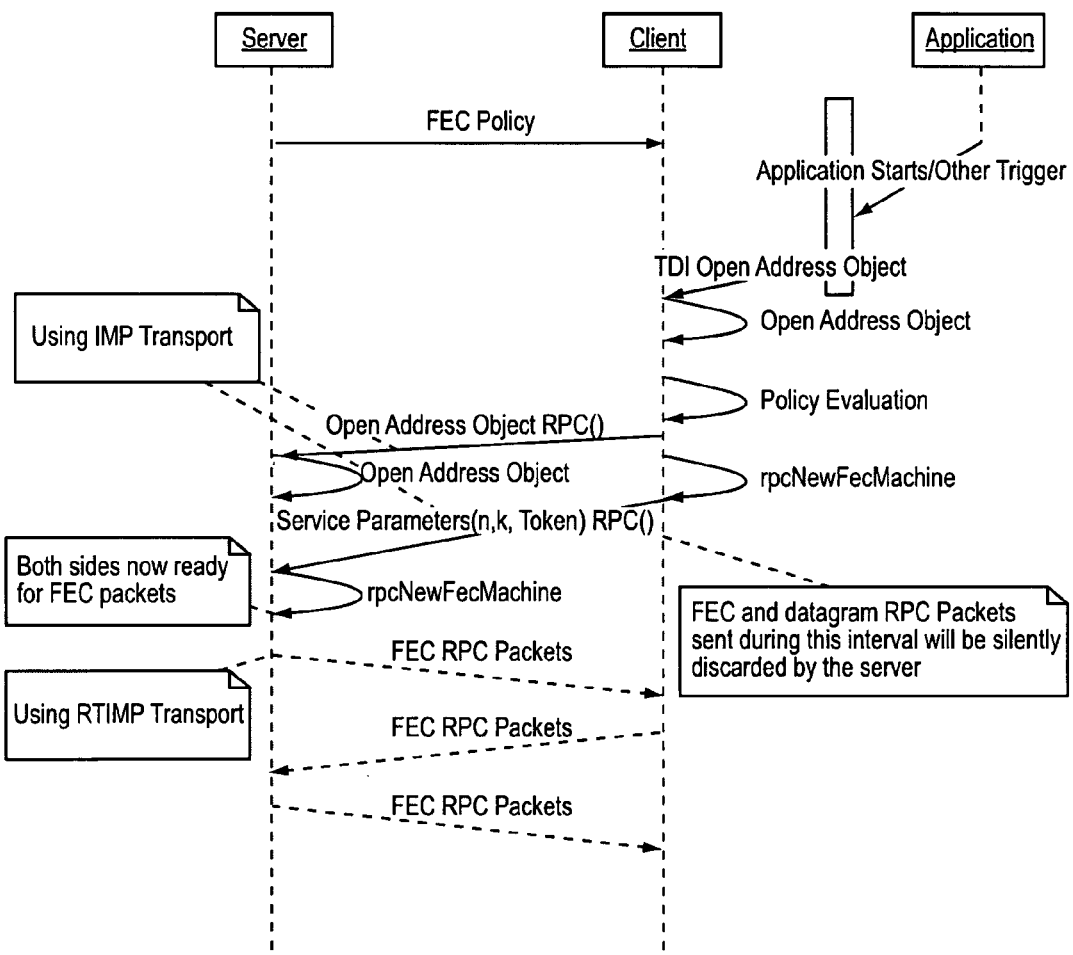
FIG. 10 shows an exemplary illustrative non-limiting RPC FEC startup sequence.

FIG. 10 shows an exemplary illustrative RPC FEC Startup Sequence illustrating the flow of events for creating an RPC FEC flow.

The server uses IMP and sends a policy containing FEC related configuration to the client.

An application is started on the client, an AddressObject is created and an Open AddressObject RPC is sent from the client to the server using IMP.

The server processes the Open AddressObject RPC and creates an AddressObject.

At the client, policy is evaluated and if required a call is made to rpcNewFecMachine to create the client object and binding for the RPC FEC flow.

A service parameters RPC is sent from the client to the server using IMP with RPC FEC parameters as defined in this document The server processes the service parameters RPC and if required calls rpcNewFecMachine to create the server object and binding for the RPC FEC flow.

Figure 11:
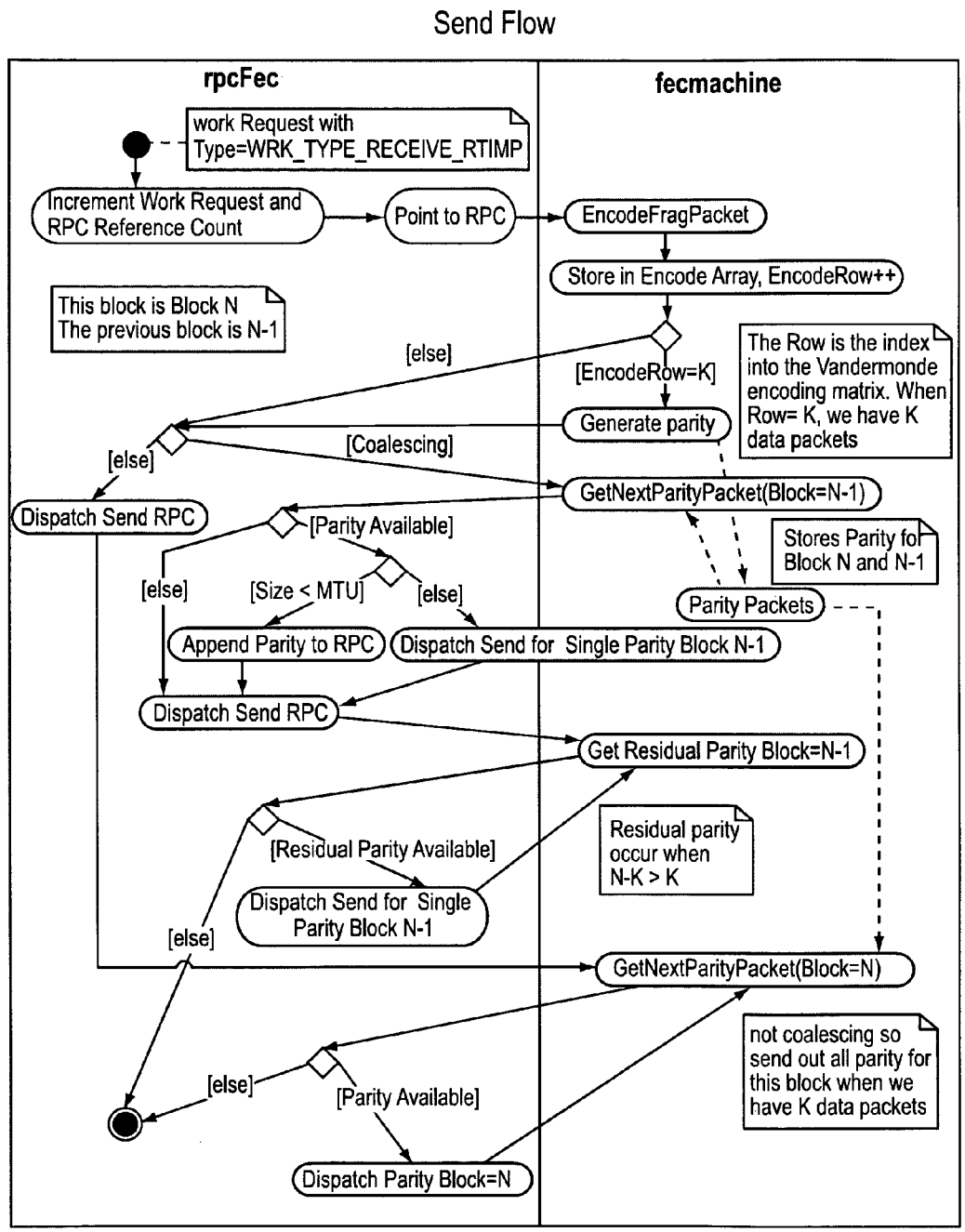
FIG. 11 shows an exemplary illustrative non-limiting send flow of information between RPCFEC and FEC machine virtual devices.

Once both the client and server have an RPC FEC flow defined, RPC FEC packets may be sent and received between the client and server using the RTIMP rpcFec and FecMachine Send Flow FIG. 11 shows an exemplary illustrative non-limiting Send Flow Shared Between rpfFec and FecMachine and illustrates how work is shared between the rpcFec and FecMachine objects during the send process.

When a work request is provided to the rpcFec object it increments the reference count and calls the EncodFragPacket method of FecMachine. EncodeFragPacket will store the work request in the encoding array. If K packets are available, the encoding process occurs and the resulting parity packets are stored. Flow then returns to rpcFec. Note the reference count is incremented because the FecMachine will hold onto the work request until all K packets in the current block are received and encoding is completed.

If coalescing is enabled, rpcFec calls the FecMachine GetNextParityPacket method requesting parity for the previous block (N−1). If a parity packet is available it attempts to combine the parity for block N−1 with the original RPC packet which is part of block N. If the combined packet size is less than the MTU a coalesced packet is transmitted. Otherwise 2 separate packets, the RPC and the Parity are sent individually.

If coalescing is in effect, rpcFec will then also check if any residual parity packets are available. This occurs with N−K>K, the number of parity packets per block is greater than the number of data packets per block as is the case when N=5 and K=2 for example. If there are, rpcFec loops through sending each as an individual parity packet after the original RPC.

If coalescing is not enabled rpcFec will request parity for block N after sending the original RPC packet. If this was the Kth RPC in the block, parity will be available. It then loops through and send all parity packets individually.

rpcFec and FecMachine Work Request Life Cycle

Figure 12:
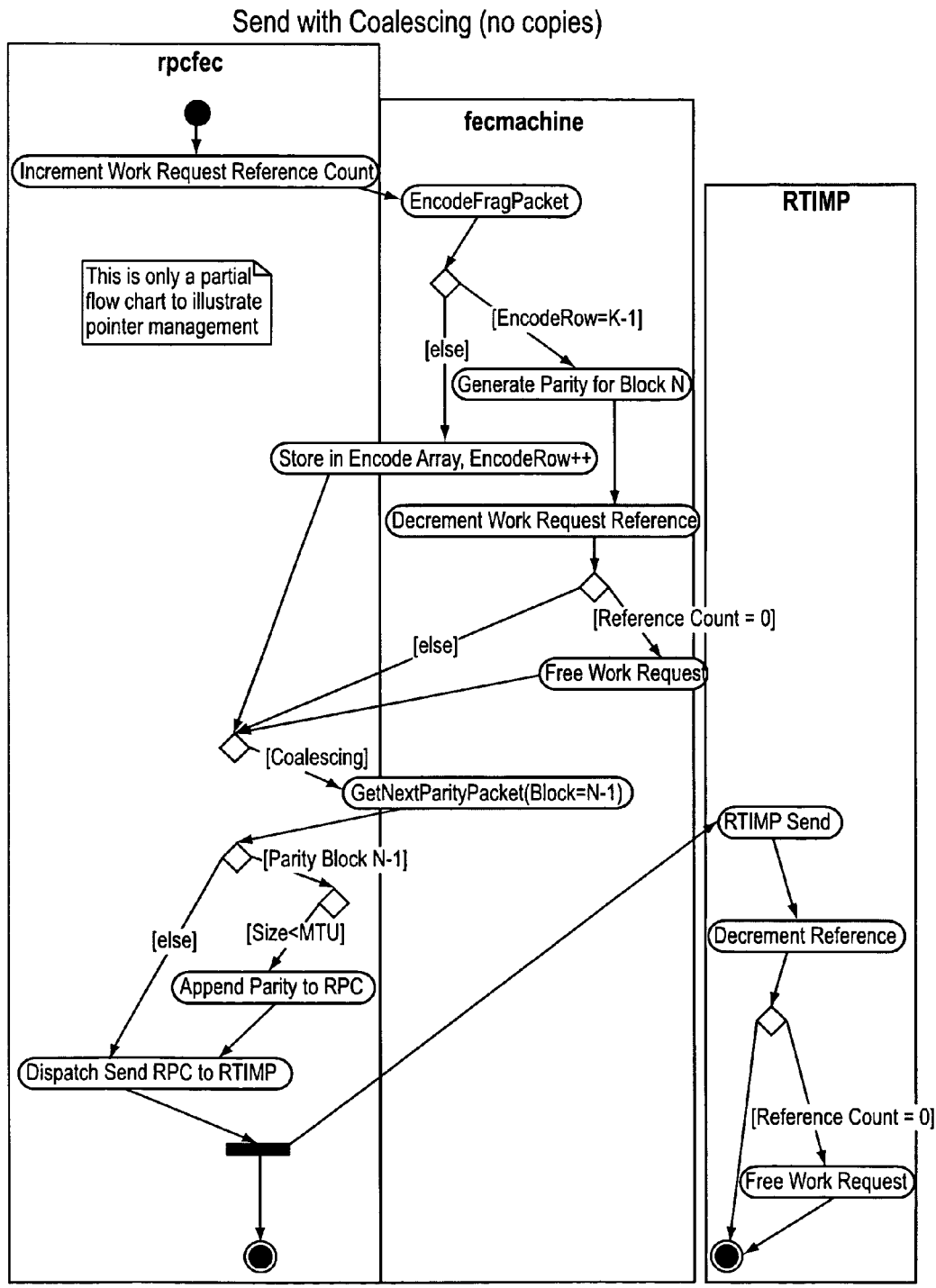
FIG. 12 shows an exemplary illustrative non-limiting send work request life cycle with coalescing.

FIG. 12 shows a Send Work Request Life Cycle that illustrates the life cycle of a work request during sends and the zero copy design. As noted previously, FecMachine will hold onto the work request until K packets in a block are available. Once the Kth packet is provided, encoding occurs to create parity packets. However, we do not want to hold up sending while waiting for the K packets. Therefore the packets are provided to the RTIMP for immediate transmission. Each module is responsible for decrementing the work request reference count and freeing memory when no longer used. In this way copies are avoided while encoding and negligible latency is added to the RPC packets transmitted.

FecMachine EncodeFragPacket

Figure 13:
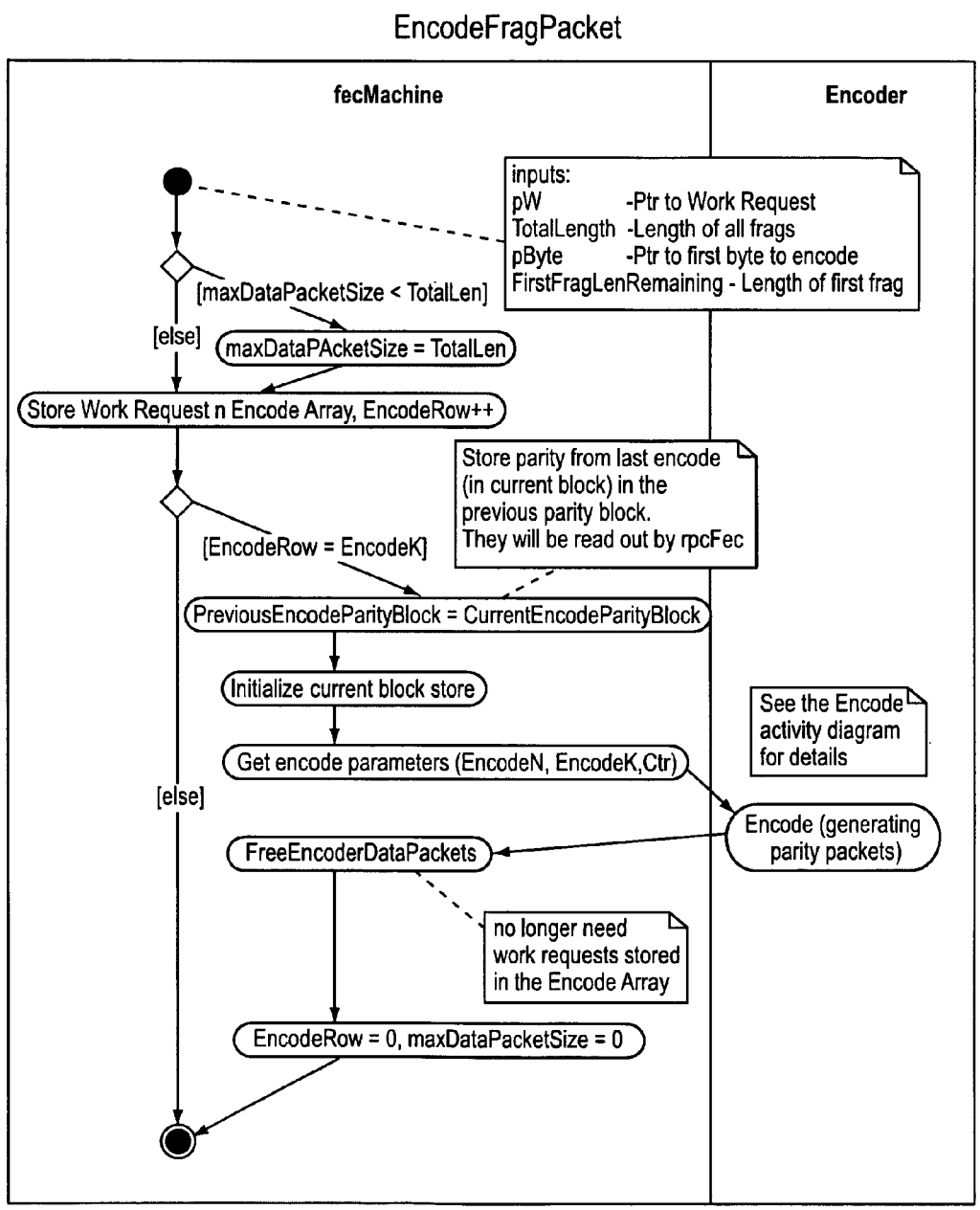
FIG. 13 shows an exemplary illustrative non-limiting forward error correction machine (FEC machine) encode fragmentation packet activity diagram.

An exemplary detailed activity diagram shown in FIG. 13: FecMachine EncodeFragPacket Activity Diagram. The encoder through this function maintains the maximum size for all packets in each encoder block. Once K packets are received, the encoding process sets the pointer to any parity packets from the previous block. The current parity block is then initialized and made ready to store pointers to the (N−K) parity packets resulting from the current block encoding which is about to be performed. Actual encoding is performed by the encoder object. It should be appreciated that the encoding creates parity packets that are as large as the largest data packet in the RS block being encoded. This has the potential for wasting network bandwidth if data packets are varying by large numbers of bytes. Policy can be provided to enable tuning of the amount of bandwidth expansion permitted. See also FIG. 3G referring to example encode and FEC bandwidth optimization bytes which illustrates a parameter defining the maximum byte spread between the smallest and largest data packet in an R RS block. To prevent excessive increases of bandwidth consumed while encoding parity packets, encoding can be turned off on a particular RS block if the value is exceeded for that block.

Example Encoder Object Encode Method

Figure 14:
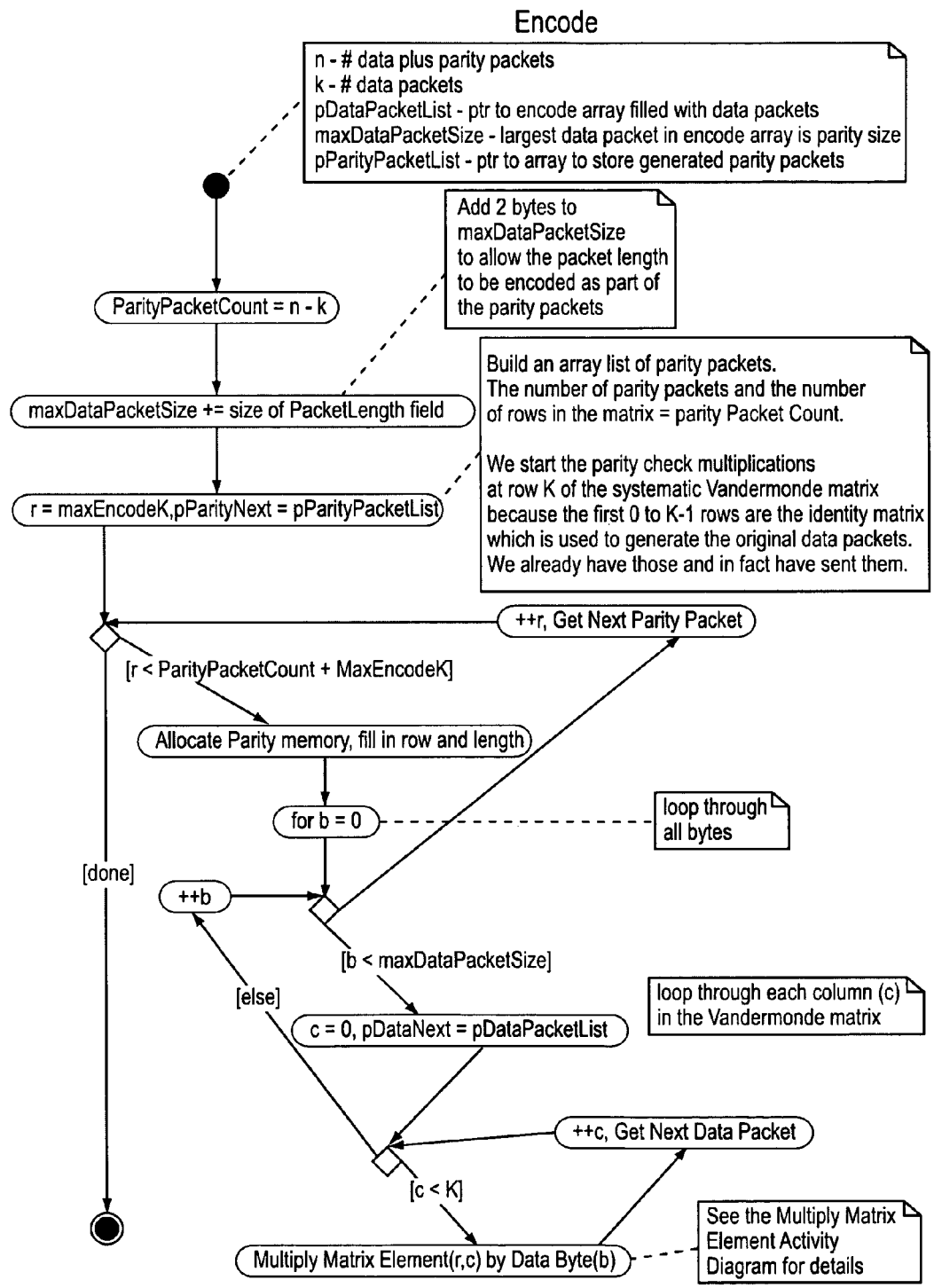
FIG. 14 shows an exemplary illustrative non-limiting encoder object encode method.
Figure 15:
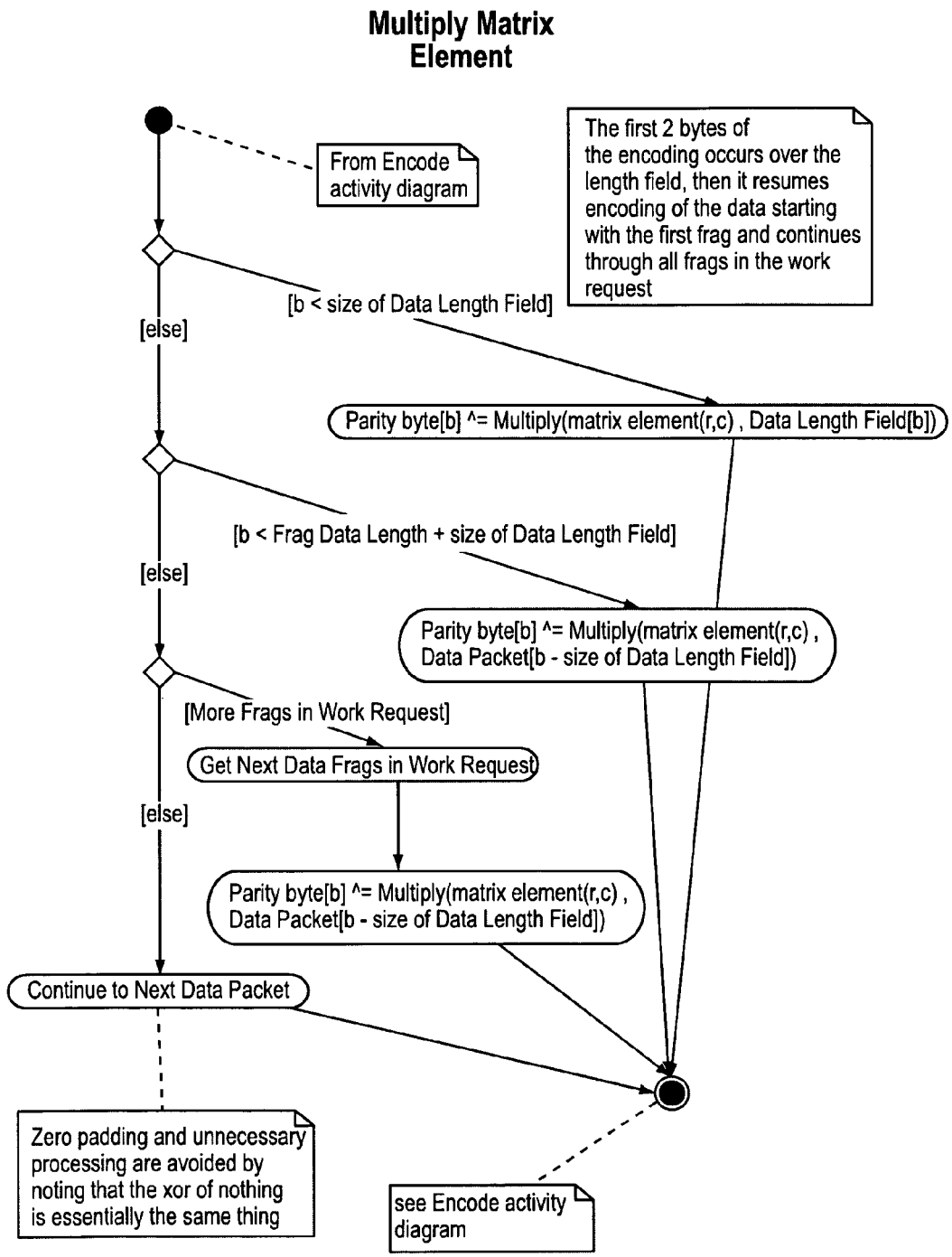
FIG. 15 shows an exemplary illustrative non-limiting encoder multiply matrix flow diagram.

FIG. 14 shows an exemplary illustrative example encoder object encode method. As shown in this diagram, a loop is performed with matrix multiplication of the encoding matrix by the matrix of K data packets. Parity is calculated using matrix multiplication. The encoding matrix is thus a two-dimensional array representing a matrix with N−K rows and K columns. The K data packets to be encoded may be a matrix with K rows and one column. It is thus possible to use matrix multiplication with a N−K times K matrix times a K by 1 matrix. The exemplary algorithm for performing such matrix multiplying in an efficient manner is shown in detail in FIG. 15.

Example Receive Flow

Figure 16:
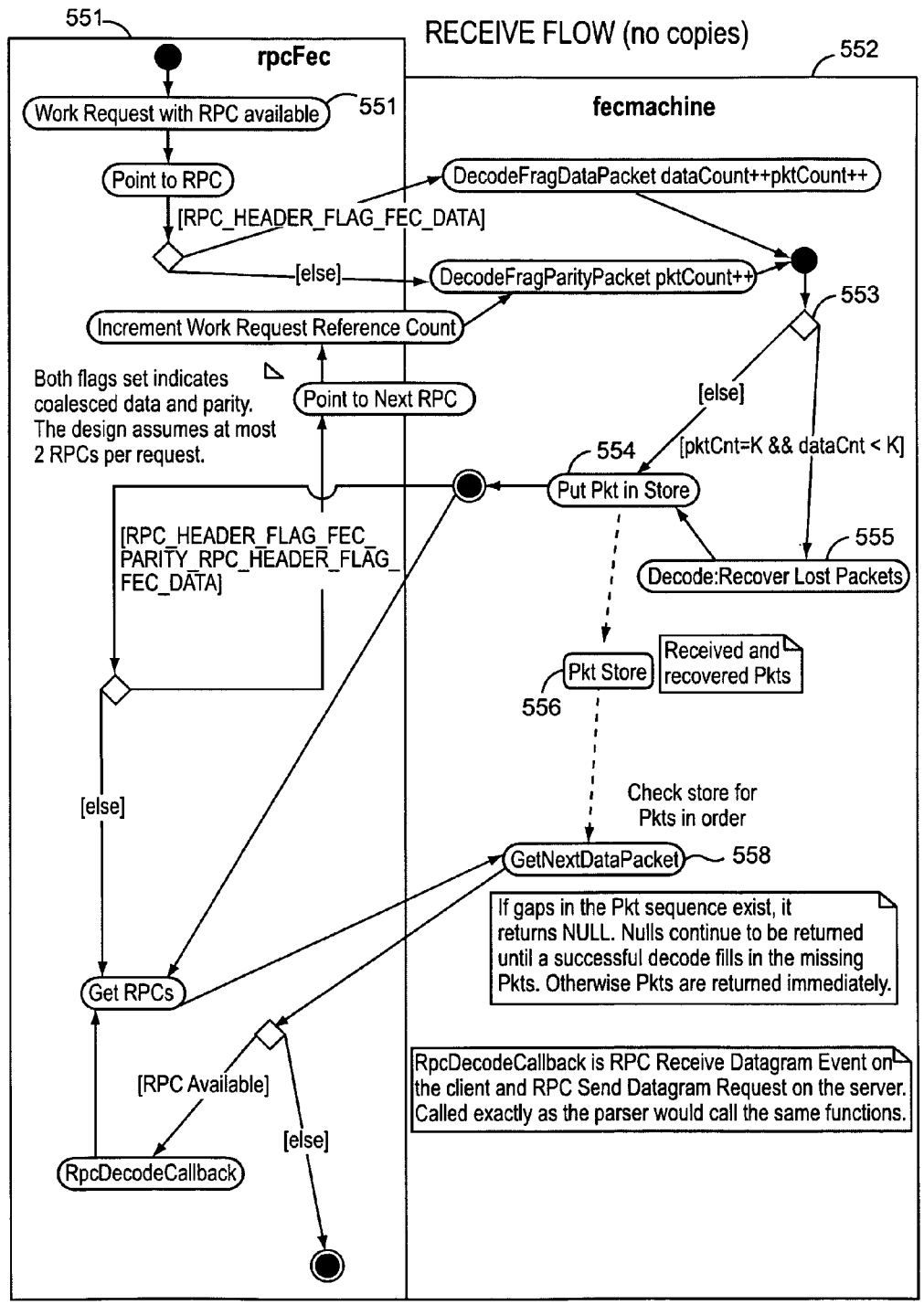
FIG. 16 shows an exemplary illustrative non-limiting receive flow.

An example receive flow diagram is shown in FIG. 16. Once it is determined that forward error correction is enabled, received work requests are sent to the RPC FEC object for received processing (block 550). When RPC FEC receives a work request, it may first send the request to the FEC machine object (block 552). The FEC machine object 552 then updates state by either adding the packet to received packet store (block 554) if the number of received packets is less than K (see decision block 552) or in the event that this is a KTH packet in the block and at least one data packet is missing, it may perform a decode operation (block 556). Once decoding is complete, recovered data packets are then added to the packet store (block 554, 556). Packets are put into the packet store in sorted order with sorting based on the encoding matrix row used to generate the packets inside the encoder.

If a parity packet is coalesced and concatenated to the end of the received data packet, then the reference count on the work request may be incremented and the parity packet is then also provided to the FEC machine object for assisting with decoding if required (e.g., when one or more data packets in a block are lost). Control flow may then be returned back to the RPC FEC object 551. The RPC FEC object may then again call into the FEC machine object using the get next data packet method asking for the next "in order" available data packet (block 558). As long as data packets are received in order, they are immediately sent to the RPC subsystem as either a receive datagram event or a send datagram request to the normal RPC callback mechanism. If however the next consecutive data packet is not available (e.g., for example data packets 0, 2 and 3 are available but data packet 1 was dropped), a null is returned, no packet is delivered to the associated application, and the system waits for the next received packet. This process may continue until either K packets for the block are received or in the event the system determines that too many packets have been dropped. If the system determines that too many packets have been dropped, then the system may attempt to resync and start processing of a next valid new block received.

In the exemplary illustrative non-limiting implementation, two types of events may cause the system to stop processing a block:

(1) a packet is received for a future block indicating the sender is now sending packets for a block outside of the block window or (2) a receive time out occurs.

In an exemplary illustrative non-limiting implementation, three stores may be checked by the get next data packet method: the current block store, the next block store, and the decode failure block store. The current block store may contain packets for the current block. The next block store contains the packets for the next block. A decode failure queue may contain packets from blocks that had too many errors to perform error recovery but manage to receive at least one valid data packet. It may also contain packets from blocks that receive time out expirations between consecutive received data packets.

As the exemplary illustrative non-limiting system accepts packets from two consecutive blocks, the current and next blocks, at any one time, it can maintain ordering of packets for a "2×N" sequence number window. Packets earlier than the current block may be dropped as duplicates. packets newer than the next block may cause the system state to advance one block. When system window advance occurs, the next block becomes the current block and the old current block is reinitialized and defined as the new next block. In other words, the blocks may be swapped. The received packet that caused the window advance may then be stored in the new next block.

Example Decode Receive Packets

Figure 17:
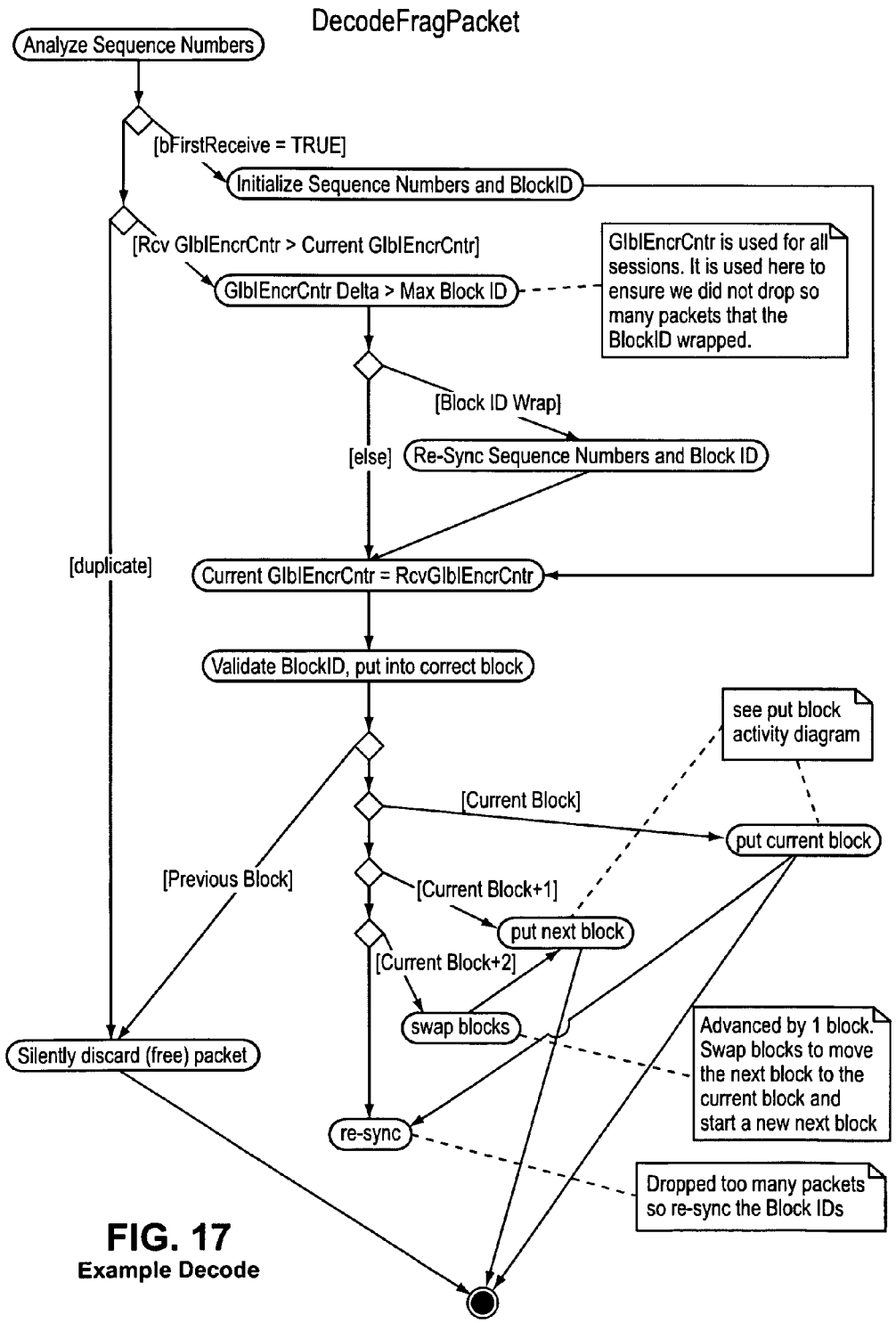
FIG. 17 shows an exemplary illustrative non-limiting decode fragmentation packet flow diagram.
Figure 18:
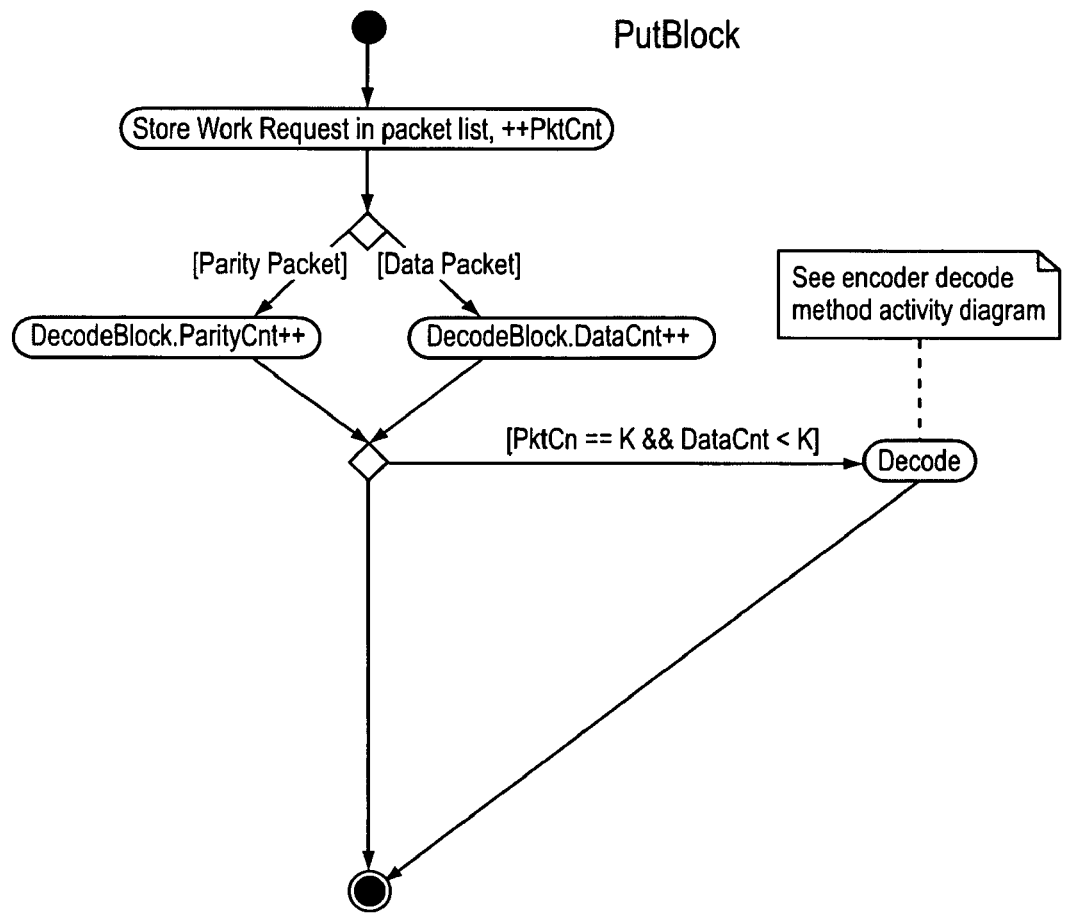
FIG. 18 shows an exemplary illustrative non-limiting put block (including decode) flow diagram.

FIG. 17 is a flowchart showing an example decode process for received packets. This may be performed, as discussed above, using the FEC machine object that handles received packets. It may use various counter fields to maintain synchronization for received packet flow. Data stores for the current block and next block are provided. Using the block ID, if the packet is in the current block, the process may put the packet into the current block store and decode if K packets have been received and at least one data packet has been dropped (at least one of the K packets is a parity packet). Using the block ID, if the packet block ID equals the next block block ID, the process may put into the next block store and decoded if K packets have been received and at least one data packet has been dropped (at least one of the K packets is a parity packet). If the packet block ID is 2 more than the current block block ID, then it is assumed that synchronization has been lost and that desynchronization should occur. In this case, the packets in the next block store become the current block and the packet received becomes the first packet in the new next block. If there were some valid packets in the current block before desynchronization, they are saved away into the decode failure block.

If the received packet block ID is greater than 2 more than the ID of the current block, the exemplary illustrative non-limiting system assumes both the current block and the next block are no longer relevant (too many packets lost) and both blocks are reinitialized with the just-received packet before being the first packet stored in the new current block. If there were some valid packets in the current or next blocks before resynchronization, they may be saved away in the decode failure queue. The decode failure queue may store the data packet until read by the associated application.

Delivering packets in a timely fashion even when some packets are missing is preferred over not delivering the packets at all or delivering packets that are excessively delayed but in order. The definition of timeliness varies by application to application, and may not necessarily be ascertained in advance. Therefore, the exemplary illustrative non-limiting implementation provides a configurable policy setting for configuring a receive time out. For example, a default may be provided for 250 ms, with a range of 10-10,000 ms. The decoder when disabled may wait indefinitely for the next received packet or until the FEC flow is deleted before freeing packets in the decoded block. When enabled and the time period between any two consecutive received packets exceeds this value, the decoder will provide all available received packets to the application associated with the FEC flow even if a successful decode has not occurred. Packets are provided to the application even if some of the packets in the flow have been lost with a best effort to keep the packets that have been received in the correct order. It is expected that typical real time flows will not experience this time out often. Received time out functionality may be handled by the FEC machine (as described above) when called by the RPC FEC through the FEC machine receive time out method. When called, this method may call a private decode failure method to process the current and the next blocks of decode failures. The decode failure method may take all pending received data packets in the current and next blocks and move then to the decode failure queue. Pending data packets are those that have been received but not yet given to their associated application because they were received out of order or with consecutive data packets missing. The decode failure queue stores the unprocessed packets until they are read by RPC FEC and provided to their associated application through the normal received call back mechanism albeit with the possibility that some consecutive packets are missing.

Example FEC Decode

Figure 19:
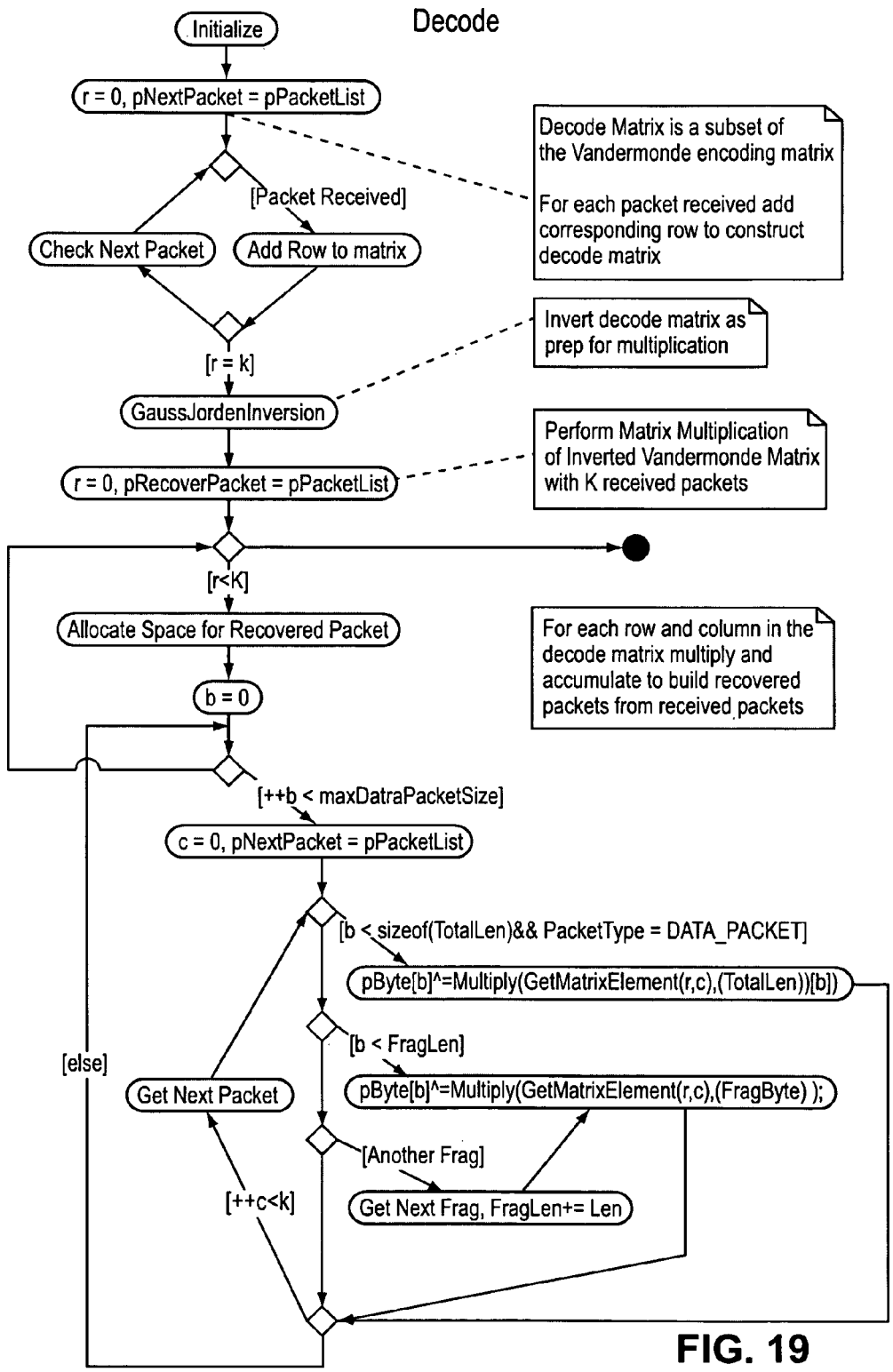
FIG. 19 shows an exemplary illustrative non-limiting decode flow diagram.

FIG. 19 shows an example decode process performed by the FEC machine to recover lost packets when at least one of the K data packets has been lost. When K packets are received, a decoding matrix is constructed from the original encoding matrix that consists of those rows formed by using the row index of the received packets. Rows corresponding to lost packets are deleted from the matrix. Due to the use of a Vander monde matrix for encoding, this matrix is guaranteed to be non-singular. Galois-Jordan inversion is then performed on the matrix. Decoding takes place by multiplying K×K inverted decode matrix by the K×1 matrix formed by the K received packets (a subset of the data plus parity packets that were transmitted). Since decoding is not necessary if all K packets are received, the decoding matrix will always consist of rows from at least one more parity packets in this particular example.

The exemplary illustrative non-limiting FEC encode and decode design is based on a very simple principle: N independent equations are required to solve for N different unknowns. For example, if we have 3 variables X, Y, Z and 3 equations $$a_1X + a_2Y + a_3Z = C_1$$

$$b_1X + b_2Y + b_3Z = C_2$$

$$d_1X + d_2Y + d_3Z = C_3$$

we may find X, Y, and Z using simple algebra.

If we had a 4$^{th}$ equation, call it the parity equation, derived as a linear combination of the other 3 equations, we should be able to lose any one of the original 3 equations and still solve the system for the 3 unknowns. This concept is analogous to the principles involved with RS codes.

RS Encoding

To introduce RS codes we define the following:
D(i) denote data packets i=1 through k to be protected
C(i) denote checksum packets i=k+1 to n
G=the n×k matrix defining our n equations
I(k)=the k×k identity matrix
then $\overline{C}=G\overline{D}$ as shown below where C is the vector representing packets sent over the wire and includes the original data packets plus checksum packets.

$$n \downarrow \begin{bmatrix} 1 & 0 & 0 & \cdots & \\ 0 & 1 & 0 & \cdots & \\ 0 & 0 & 0 & \cdots & 1 \\ 1 & \alpha_0 & \alpha_0^2 & \cdots & \alpha_0^{k-1} \\ 1 & \alpha_1 & \alpha_1^2 & \cdots & \alpha_1^{k-1} \\ 1 & \alpha_2 & \alpha_2^2 & \cdots & \alpha_2^{k-1} \\ & & \cdot & & \\ & & \cdot & & \\ & & \cdot & & \\ 1 & \alpha_{n-k-1} & \cdots & & \alpha_{n-k-1}^{k-1} \end{bmatrix} \begin{bmatrix} D_1 \\ D_2 \\ \cdot \\ \cdot \\ \cdot \\ D_k \end{bmatrix} = \begin{bmatrix} C_1 \\ C_2 \\ \cdot \\ \cdot \\ \cdot \\ C_n \end{bmatrix}$$

Note that C(1) through C(k) above are simply the original data packets D(1) through D(k) as a result of multiplication by the identity matrix I(k). C(k+1) through C(n) are the n−k checksum packets.

Data Recovery with Packet Loss

The following discussion assumes we have encoded (n) packets and sent them to the remote peer. Further at least (k) packets were received and at most (n−k) were lost.

Let C'(i) be the i packets received assuming not all packets are received successfully
Let G' be the k×k matrix formed by the k rows of the original G matrix that correspond to the received packets.
Our original data can be recovered as $\overline{D}=G'^{-1}\overline{C'}$
Notice that the solution involves inversion of the matrix G'. The problem is that not all matrices have an inverse. Therefore we select the parameters alpha "α" to create an invertible matrix.

Finite Fields

Before diving into where alpha values come from, observe that the matrix operations involve multiplication and addition. For the math to work, we should not lose any precision when calculating the checksum packets that are sent over the wire after they are multiplied by the matrix. We also do not want to have the size of a byte expanded due to overflow after an addition or multiplication operation because this overflow represents more overhead on the network. i.e. we do not want to send 16 bit quantities and 32 bit quantities for values that could have been represented in bytes (8 bit quantities).

To get around the expansion of encoded data, we can use finite field mathematics. Arithmetic in a finite field is different from standard arithmetic. All operations must always yield results that remain within the field. There are a limited number of elements in a set defining a finite field. Addition, subtraction, multiplication, and division should all be supported. Further implied by these rules there must exist an additive inverse, a +(−a)=0, and a multiplicative inverse a*a$^{-1}$=1. The multiplicative inverse must exist for all non zero elements. One example of a common set of elements that does NOT represent a finite field is the set of all integers. This is because division of integers can create fractions that are not part of the set from which they came.

If we simply use modulo 256 to define the set of elements from 0 to 255, the math will not work out because such a set of values does not support a multiplicative inverse and therefore is not closed with regard to multiplication. A simple example for mod 8 is provided below. Enumerating through all possible values, we want to find a value x such that (6*x) mod 8=1 but no value of x in the set exists for the solution. The same is true for 16 and 256 because they are not relatively prime with the elements in the defined set. A system using the prime value 7 is also provided as an example to show that all non zero elements in the set 1-6 have a multiplicative inverse mod 7.

6*1 mod 8=6
6*2 mod 8=4
6*3 mod 8=2
6*4 mod 8=0
6*5 mod 8=6
6*7 mod 8=2
1*1 mod 7=1
2*4 mod 7=1
3*5 mod 7=1
4*2 mod 7=1
5*3 mod 7=1
6*6 mod 7=1

Division example mod 7: 5/3 mod 7 7=5*5 mod 7 is 4 mod 7 since the multiplicative inverse of 3 is 5. This ring is closed for all required operators and hence is a field.

In each row of the matrix starting at row k+1, we have increasing powers of alpha. The first 3 rows of the parity check portion of the matrix (starting at row k+1) are shown below.

Row k+1 $(X^0)^0, (X^0)^1, (X^0)^2, (X^0)^3, (X^0)^4 \ldots$
Row k+2 $(X^1)^0, (X^1)^1, (X^1)^2, (X^1)^3, (X^1)^4 \ldots$
Row k+3 $(X^2)^0, (X^2)^1, (X^2)^2, (X^2)^3, (X^2)^4 \ldots$ The first k packets in C are our original data packets. We do not have to multiply the data packets times the I(K) identity matrix. We can send them to the peer as we always have before. To create the parity packets, the example code can start at row k+1 and multiply the k data packets (that we may have already sent to the peer) by the k values in that row to create parity check packet C(k+1). If we want to build a code with n=7 total packets and k=4 data packets (n−k=3 parity packets), we can just multiply the 4 data packets by each of the rows K+1, K+2, and K+3. Each completed row multiplication creates 1 parity packet for a total of the required 3 parity packets.

The code can be called once for each parity packet to be generated.

```
//*******************************************
// k:          number of data packets
// column:     column in the G matrix
// row:        row of the parity packet in G
// α_row^column  matrix value at column, row
//*******************************************
NextPacket = FirstPacket;
for ( column = 0; column < k ; column++, DataPacket = NextPacket ) {
    //*******************************
    //For each column get the value in the
    //row of the matrix, these are the
    //elements of the matrix α_row^column
    //*******************************
    α_row^column = alpha[ (column * row) % ( p^m - 1 ) ].value;
```

-continued

```
for (j=0;j<DataPacketLength; ++j){
    checksumPacket++ ^= ProductTable[α_row^column, *DataPacket++ ];
  }
}
```

Notice there is another modulo operator and multiplication. Typical code values will have n<16, and k<8. If this impacts performance we have the option of creating another simple table for 1*j mod % (p^m−1) that would take up about 128 bytes for this typical range of values. However, these operations only happen once per packet, not once for each byte in a packet, so using the multiplication and mod operator is acceptable.

Privacy and Ciphering

An example Counter Mode BitField structure may be defined in the exemplary implementation:
// should be a total of 128 bits.

```
typedef struct tagCTR_MODE_BITFIELD
{
    uint32_t Emils32            :32;  //
    uint32_t BlockId            :32;  // 32 bits rpc stuff
    uint64_t GlblEncrCntr       :48;  // first 48 bits enc stuff
    uint64_t CodecN             :5;   // make sure these match
    CODEC_CTR_BITFIELD above
    uint64_t CodecK             :5;   //"
    uint64_t CodecRow           :5;   //"
    uint64_t CodecReserved      :1;   //"
} CTR_MODE_BITFIELD, *PCTR_MODE_BITFIELD;
```

Some of this information can be used for ciphering the data. The combination of the fields Emils32 plus BlockId plus GlblEncrCntr results in a 112 bit unique identifier for each packet which may be used as part of the IV/counter information. One exemplary illustrative non-limiting implementation employs AES Galous Counter Mode ciphering algorithm (http://csrc.nist.gov/CryptoToolkit/modes/proposedmodes/gcm/gcm-revised-spec.pdf#search=%22initialization%20vector%20256%20bit%20AES%20counter%20mode%22) but other encryption or enciphering techniques could be used instead. The exemplary illustrative non-limiting implementation can support all currently supported AES key lengths (128,192,256).

The patents and publications cited above are incorporated herein by reference.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. A method of communicating first and second data streams over a network between a first node and a second node, comprising:
   (a) packetizing a first data stream for transmission using a substantially guaranteed reliable communication protocol providing retransmission upon no acknowledgement;
   (b) packetizing a second, real time data stream for transmission using an unreliable communication protocol that does not provide retransmission upon no acknowledgement;
   (c) inserting first data stream packets and second data stream packets into a common transmission frame structure; and
   (d) using at least one processor, automatically selectively protecting said second data stream packets but not said first data stream packets with a forward error correction having a block size that is dynamically adjusted based on network conditions,
   wherein said selectively protecting adapts to ephemeral port allocation.

2. The method of claim 1 wherein said selectively protecting comprises delivering said second data stream packets with degrees of error correction that dynamically take timeliness and network conditions into account.

3. The method of claim 1 wherein said selectively protecting includes selectively applying optimizations depending on the application said second data stream is associated with.

4. The method of claim 1 wherein said selectively protecting includes automatically distinguishing between application protocol streams.

5. The method of claim 1 wherein said selectively protecting includes applying packet sized variance per K block.

6. The method of claim 1 wherein said selectively protecting includes providing N/K forward error correction and dynamically changing N based on at least one of packet size variance and observed decode error rate.

7. The method of claim 1 wherein said selectively protecting includes providing forward error correction for a number of parity packets N−K>K.

8. The method of claim 1 wherein said selectively protecting includes tuning optimizations to maintain acceptable real time data communication performance.

9. The method of claim 1 wherein said inserting comprises coalescing together real time data from different sources into a single frame structure and forwarding the frame structure including said coalesced data for demultiplexing at a receiver.

10. The method of claim 1 further including applying stream enciphering using counter mode.

11. The method of claim 1 further including applying quality of service marking to said streams.

12. The method of claim 1 further including allowing network point of presence to change without substantially affecting data flow.

13. The method of claim 1 further including using a depth limited queue and applying a head-end discard mechanism to effectively flush aged state data of said queue.

14. A system for transmitting first and second data streams over a network, comprising:
   a packetizer that packetizes a first data stream for transmission using a substantially guaranteed reliable communication protocol providing retransmission upon no acknowledgement, and packetizes a second, real time data stream for transmission using an unreliable communication protocol that does not provide retransmission upon no acknowledgement;
   an encoder that selectively protects said second data stream packets but not said first data stream packets with a forward error correction having a number of data packets per block K that is dynamically adjusted based on network conditions and having a total number N of packets per block;
   a frame generator configured to insert first data stream packets and second data stream packets into a common frame structure for transmission; and
   a transmitter that transmits said common frame structure, wherein said transmitter transmits blocks with a number of parity packets N−K>K.

15. The system of claim 14 wherein said encoder dynamically monitors packet size variance to selective and dynamically adjusts the degree of forward error correction overhead to thereby take network congestion and other factors into account, thereby maximizing the benefit of forward error correction while minimizing potential adverse impact on network overhead and timeliness.

16. A system for transmitting first and second data streams over a network, comprising:
- an encoder that selectively encodes first and second real time data streams with forward error correction, the encoder being configured to (a) packetize the first data stream for transmission using a substantially guaranteed reliable communication protocol providing retransmission upon no acknowledgement, (b) packetize the second, real time data stream for transmission using an unreliable communication protocol that does not provide retransmission upon no acknowledgement, (c) insert first data stream packets and second data stream packets into a common transmission frame structure, and (d) selectively protect said second data stream packets but not said first data stream packets with a forward error correction having a block size that is dynamically adjusted based on network conditions; and
- a transmitter that transmits said encoded stream using an unreliable communication protocol that does not provide retransmission upon no acknowledgement,
- wherein said encoder dynamically monitors packet size variance to selectively and dynamically adjust the degree of forward error correction overhead to thereby take at least one network condition including network congestion into account, thereby reducing potential adverse impact of said forward error correction on bandwidth constraints and timeliness.

17. A method of communicating first and second data streams over a network between a first node and a second node, comprising:
(a) packetizing a first data stream for transmission using a substantially guaranteed reliable communication protocol providing retransmission upon no acknowledgement;
(b) packetizing a second, real time data stream for transmission using an unreliable communication protocol that does not provide retransmission upon no acknowledgement;
(c) inserting first data stream packets and second data stream packets into a common transmission frame structure; and
(d) selectively protecting said second data stream packets but not said first data stream packets with a forward error correction having a block size that is dynamically adjusted based on network conditions,
wherein said selectively protecting includes using at least one processor to dynamically monitoring packet size variance to selectively and dynamically adjust the degree of forward error correction overhead to thereby take network congestion and other factors into account, thereby maximizing the benefit of forward error correction while minimizing potential adverse impact on network overhead and timeliness.

18. A method of communicating first and second data streams over a network between a first node and a second node, comprising:
(a) packetizing a first data stream for transmission using a substantially guaranteed reliable communication protocol providing retransmission upon no acknowledgement;
(b) packetizing a second, real time data stream for transmission using an unreliable communication protocol that does not provide retransmission upon no acknowledgement;
(c) inserting first data stream packets and second data stream packets into a common transmission frame structure; and
(d) selectively protecting said second data stream packets but not said first data stream packets with a forward error correction having a block size that is dynamically adjusted based on network conditions,
wherein said selectively protecting includes using at least one processor to automatically determine when to reduce or turn off forward error correction based on packet size variance.

* * * * *